(12) United States Patent
Opalka et al.

(10) Patent No.: US 6,259,699 B1
(45) Date of Patent: Jul. 10, 2001

(54) SYSTEM ARCHITECTURE FOR AND METHOD OF PROCESSING PACKETS AND/OR CELLS IN A COMMON SWITCH

(75) Inventors: Zbigniew Opalka, Harvard; Vijay Aggarwal, Marlboro; Thomas Kong, Brookline; Christopher Firth, Bellingham, all of MA (US); Carl Costantino, Londonderry, NH (US)

(73) Assignee: Nexabit Networks, LLC, Marlboro, MA (US)

( * ) Notice: Subject to any disclaimer, the term of this patent is extended or adjusted under 35 U.S.C. 154(b) by 0 days.

(21) Appl. No.: 09/001,040

(22) Filed: Dec. 30, 1997

(51) Int. Cl.[7] ................................................. H04L 12/28
(52) U.S. Cl. ........................................... 370/398; 370/389
(58) Field of Search ................................... 370/395, 401, 370/398, 412, 415, 465, 468, 353, 352, 402, 389, 428

(56) References Cited

U.S. PATENT DOCUMENTS

| | | | | |
|---|---|---|---|---|
| 5,144,619 | * | 9/1992 | Munter | 370/353 |
| 5,802,052 | * | 9/1998 | Venkataraman | 370/395 |
| 5,918,074 | * | 6/1999 | Wright et al. | 710/52 |

* cited by examiner

*Primary Examiner*—Douglas Olms
*Assistant Examiner*—Ken Vanderpuye
(74) *Attorney, Agent, or Firm*—Rines and Rines

(57) ABSTRACT

A novel networking architecture and technique for transmitting both cells and packets or frames across a common switch fabric, effected, at least in part, by utilizing a common set of algorithms for the forwarding engine (the ingress side) and a common set of algorithms for the QoS management (the egress part) that are provided for each I/O module to process packet/cell information without impacting the correct operation of ATM switching and without transforming packets into cells for transfer across the switch fabric.

17 Claims, 15 Drawing Sheets

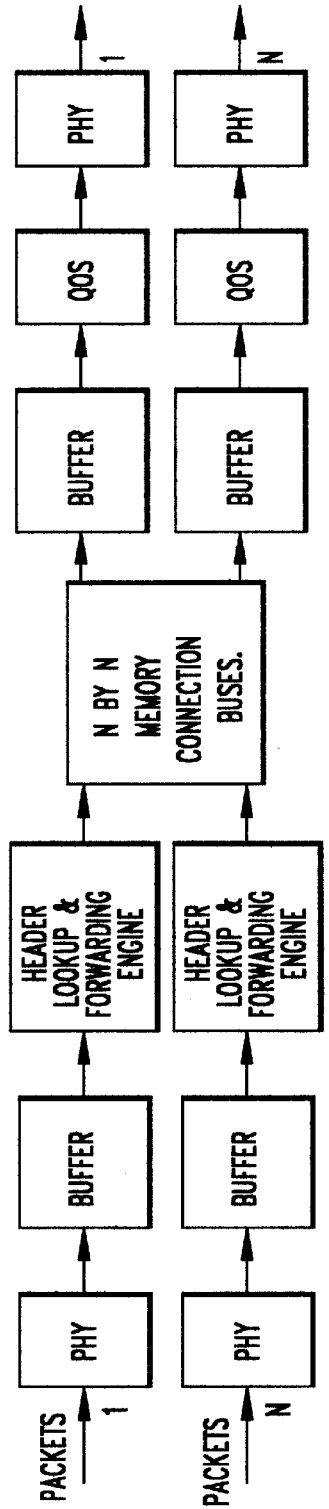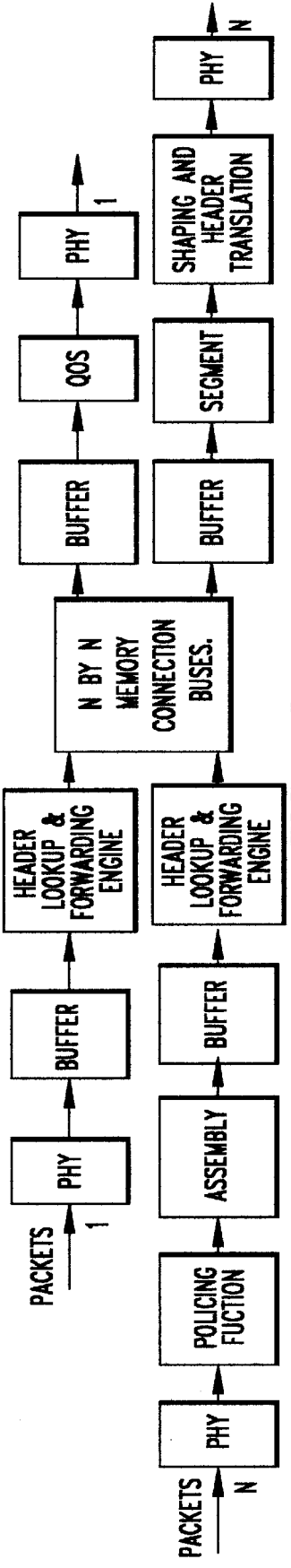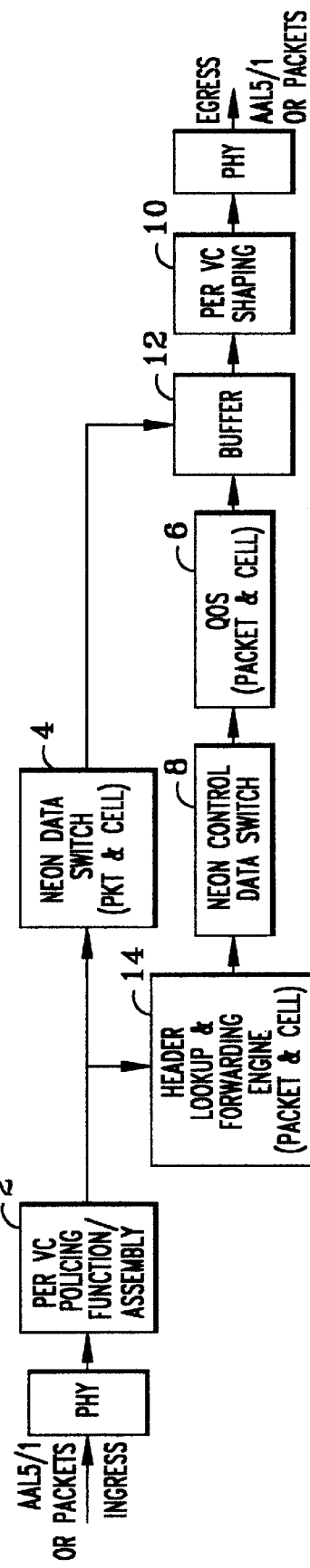

SYSTEM ARCHITECTURE FOR AND METHOD OF PROCESSING PACKETS AND/OR CELLS IN A COMMON SWITCH

The present invention relates to networking systems and the forwarding and routing of information therein, being more particularly directed to the problems of a common method for managing both cell and packet or frame switching in the same device, having common hardware, common QoS (Quality of Service) algorithms, common forwarding algorithms; building a switch that handles frame switching without interfering with cell switching.

BACKGROUND OF INVENTION

Two architectures driving networking solutions are cell switching and frame forwarding. Cell switching involves the transmission of data in fixed size units called cells. This is based on technology referred to as Asynchronous Transfer Mode (ATM). Frame forwarding transmits data in arbitrary size units referred to either as frames or packets. The basis of frame forwarding is used by a variety of protocols, the most noteworthy being the Internet Protocol (IP) suite.

The present invention is concerned with forwarding cells and frames in a common system utilizing common forwarding algorithms. In co-pending U.S. patent application Ser. No. 581,467, filed Dec. 29, 1995, for High Performance Universal Multi-Ported Internally Cached Dynamic Random Access Memory System, Architecture and Method, now U.S. Pat. No. 5,799,209 issued Aug. 25, 1998 and co-pending U.S. patent application Ser. No. 900,757, filed Jul. 25, 1997, for System Architecture for and Method of Dual Path Data Processing and Management of Packets and/or Cells and the Like, now U.S. Pat. No. 5,918,074 issued Jun. 29, 1999 both of common assignee herewith, a promising solution of common cell/frame forwarding is provided.

Most traditional Internet-style host-to-host data communication is carried out in variable size packet format, interconnected by networks (defined as a collection of switches) using packet switches called routers. Recently, ATM has become widely available as a technology to move data between hosts, having been developed to provide a common method for sending traditional telephony data as well as data for computer-to-computer communication. The previous method employed was to apply Time Division Multiplexing (TDM) to telephony data, with each circuit allocated a fixed amount of time on a channel. For example, circuit A may be allocated x amount of time (and thus data), followed by y and z and then x again, as later described in connection with hereinafter discussed FIG. 3. Thus each circuit is completely synchronous. This method, however, has intrinsic limitations with bandwidth utilization, since if a circuit has nothing to send, its allocated bandwidth is not used on the line. ATM addresses this bandwidth issue by allowing the circuits to be asynchronous. Though bandwidth is still divided among fixed length data items, any circuit can transmit at any point in time.

The ITU-T (International Telecommunications Union—Telecommunications, formally the CCITT), an organization chartered by the United Nations to provide telecommunications standards, defined four classes of service: 1) Constant Bit Rate for Circuit Emulation, i.e. constant-rate voice and video; 2) Variable Bit Rate for certain voice and video applications; 3) Data for Connection-Oriented Traffic; and 4) Data for Connectionless-Oriented Traffic. These services, in turn, are supported by certain "classes" of ATM traffic. ATM moves data in fixed size units called cells. There are several types of ATM "types", referred to as ATM Adaptation Layers (AAL); these ATM adaptation layers are defined in ITU-T Recommendation I.363. There are 3 defined types: AAL1, AAL3/4 and AAL5. AAL2 has never been defined in the ITU-T recommendations and AAL3 and AAL4 were combined into one type. With respect to the ATM cell make-up, there is no way to distinguish cells that belong to one layer as opposed to cells that belong to another layer.

The adaptation layer is determined during circuit setup; i.e. when a host computer communicates to the network. At this time, the host computer informs the network of the layer it will use for a specific virtual circuit. AAL1 has been defined to be used for real-time applications such as voice or video; while AAL5 has been defined for use by traditional datagram oriented services such as forwarding IP datagrams. A series of AAL5 cells are defined to make up a packet. The definition of an AAL5 packet consists of a stream of cells with the PTI bit set to 0, except for the last one (as later illustrated in FIG. 1). This is referred to as a segmented packet.

Thus, in current networking technology, data is transported in either variable size packets or fixed size cells depending on the types of switching devices installed in the network. Routers can be connected to each other directly or through ATM networks. If connected directly, then packets are arbitrary size; but if connected by ATM switches, then all packets exiting the router are chopped into fixed size cells of 53 bytes.

Network architectures based on the Internet Protocol (IP) technology are designed as a "best effort" service. This means that if bandwidth is available, the data gets through. If, on the other hand, bandwidth is not available then the data is dropped. This works well with most computer data applications such as file transfers or remote terminal access. This does not work well with applications that can not retransmit, or where retransmission is of no value, such as with video and voice. Getting a video frame out of order makes no sense, whereas file transfer applications can tolerate such anomalies. Since the packet size is arbitrary at any point in time making specific delay variation commitments between any two frames is almost impossible, as there is no way of predicting what type and size of traffic is ahead of any other type of traffic. The buffers that must handle the data, moreover, must be able to receive the maximum data size, meaning that that buffering scheme must be optimized to handle larger data packets while at the same time not wasting too much memory on smaller packets.

ATM is designed to provide several service categories for different applications. These include Constant Bit Rate (CBR), Available Bit Rate (ABR), Unspecified Bit Rate (UBR) and two versions of Variable Bit Rate (VBR), real-time and non-real-time. These service categories are defined in terms of Traffic Parameters and QoS Parameters. Traffic Parameters include Peak Cell Rate (constant bandwidth), Sustainable Cell Rate (SCR), Maximum Burst Size (MBS), Minimum Cell Rate (MCR) and Cell Delay Variance Tolerance. QoS parameters include Cell Delay Variation (CDV), Cell Loss Ratio (CLR) and maximum Cell Transfer Delay (maxCTD). As an example, Constant Bit Rate CBR (e.g. the service used for voice and video applications) is defined as a service category that allows the user at call setup time to specify the PCR (peak cell rate, essentially the bandwidth), the CDV, maxCTD and CLR. The network must then ensure that the values requested by the user and accepted by the network are met; if they are met, the network is said to be supporting CBR.

The various classes of service direct the network to provide better service for some traffic as opposed to other types of traffic. In ATM, with fixed length cells, switches manage bandwidth utilization on a line effectively by controlling the amount of data each traffic flow is allowed to put on a line at any moment in time. They generally have simpler buffer techniques arising from the fact that there is but one size of data unit. Another advantage is predictable network delays, especially queuing latencies at each switch. Since all data units are the same size, this helps to ensure that such traffic QoS parameters as CDV are easily measurable in the network. In non-ATM networks (i.e. frame-based networks), frames can range anywhere from, say, 40 bytes to thousands of bytes, rendering it difficult to ensure a consistent CDV (or PDV, Packet Delay Variation) since it is impossible to predict the delays in the network, lacking consistent transfer times of individual packets.

By carving data into smaller units, ATM can increase the ability of the network to decrease the latency of transmitting data from one host to another. Such also allows for easier queue and buffer management at each hop through the network. A disadvantage, however, is that a header is added to each cell making the effective bandwidth of the network less than if the network had a larger transmission unit. For example, if 1,000 bytes are to be transferred from one host to another, then a frame-based solution would append a header (approximately 4 bytes) and transmit the entire frame in less than a second. In ATM, the 1,000 bytes is chopped into 48 bytes with a 5 bytes header; i.e. 1,000/48=20.833 (or 21 cells). Each cell is then given a 5 byte header increasing the bytes to be transmitted by 5*21=105 extra bytes. Thus ATM effectively decreases the available bandwidth to the actual data by approximately 100 bytes (or about 10%); the decreasing of end-to-end latency also decreases the available bandwidth for data transmission.

For some applications, such as video and voice, latency is more important than bandwidth while for other applications, such as file transfers, better bandwidth utilization increases performance rather than decreased hop-by-hop latency.

Recently, the demands on more bandwidth and QoS have grown many fold due to new applications for multimedia services, including the before described video and voice. This is forcing the growth of ATM networks in the core of traditional packet-based networks. ATM, because of its fixed packet size, brings reduced processing time in networks and hence faster forwarding (i.e. lower latency). It also brings with it the ability to take advantage of traffic classification. Since the cells, as earlier pointed out, are of fixed size, traffic patterns can be controlled through QoS assignments; i.e. networks can carry traditional packets (in cell format) and constant bandwidth stream data (e.g. voice/video based data).

As will subsequently be demonstrated, most conventional networking systems inherently are designed for either forwarding frames or cells but not both. In accordance with the present invention, on the other hand, through use of novel search algorithms, QoS management and management of packet/cell architecture, both cells and frames can be transmitted in the same device and with significant advantage over the prior techniques, as later more fully explained.

OBJECTS OF INVENTION

An object of the present invention, accordingly, is to provide a novel system architecture and method, useful with any technique for processing data packets and/or cells simultaneously with data packets, and without impacting the performance aspects of cell forwarding characteristics.

A further object is to provide such a novel architecture in which the architected switch can serve as a packet switch in one application and as a cell switch in another application, using the same hardware and software.

Still a further object is to provide such a system wherein improved results are achieved in managing QoS characteristics for both cells and data packets simultaneously based on a common cell/data packets algorithm.

An additional object is to provide a common parsing algorithm for forwarding cells and data packets using common and similar techniques.

Other and further objects will be explained hereinafter, and are more particularly delineated in the appended claims.

SUMMARY

In summary, from one of its important viewpoints, the invention encompasses in a data networking system wherein data is received as either ATM cells or arbitrarily-sized multi-protocol frames from a plurality of I/O modules any of which can be cell or frame interfaces, a method of processing both ATM cells or such frames in a native mode, i.e. not transforming frames to cells, using common algorithms for forwarding based on control information contained in the cell or frame and in such a manner as to preserve QoS characteristics necessary for correct operation of cell forwarding; processing the packet/cell control information in a forwarding engine with common algorithms not dependent on context-sensitive information contained in the cell or packet, and passing results including QoS information to an egress queue manager; passing the cell/ packet to the egress I/O transmit facility in such a manner as to provide a minimal cell delay variation (CDV) so as not to impact correct cell forwarding characteristics; and controlling the transmit facility so as to provide a common bandwidth management algorithm for both cell and packets and all without impacting the correct operation of either cells or packets.

Preferred and best mode designs and techniques are hereinafter presented in detail.

DRAWINGS

The invention will now be described in connection with the accompanying drawings in which the before-mentioned FIG. 1 is a diagram illustrating an ATM (Asynchronous Transfer Mode) cell format;

FIGS. 12 and 13 are similar diagrams of a packet switch with native packet interface cards and with AAL5 interface, respectively, for N×N memory connection buses;

FIG. 14 is a block diagram of the switch architecture of the present invention, using the word "NeoN" in connection with the packet and cell data switch as a trade name of NeoNET LLC, the assignee of the present application;

Figure 22:
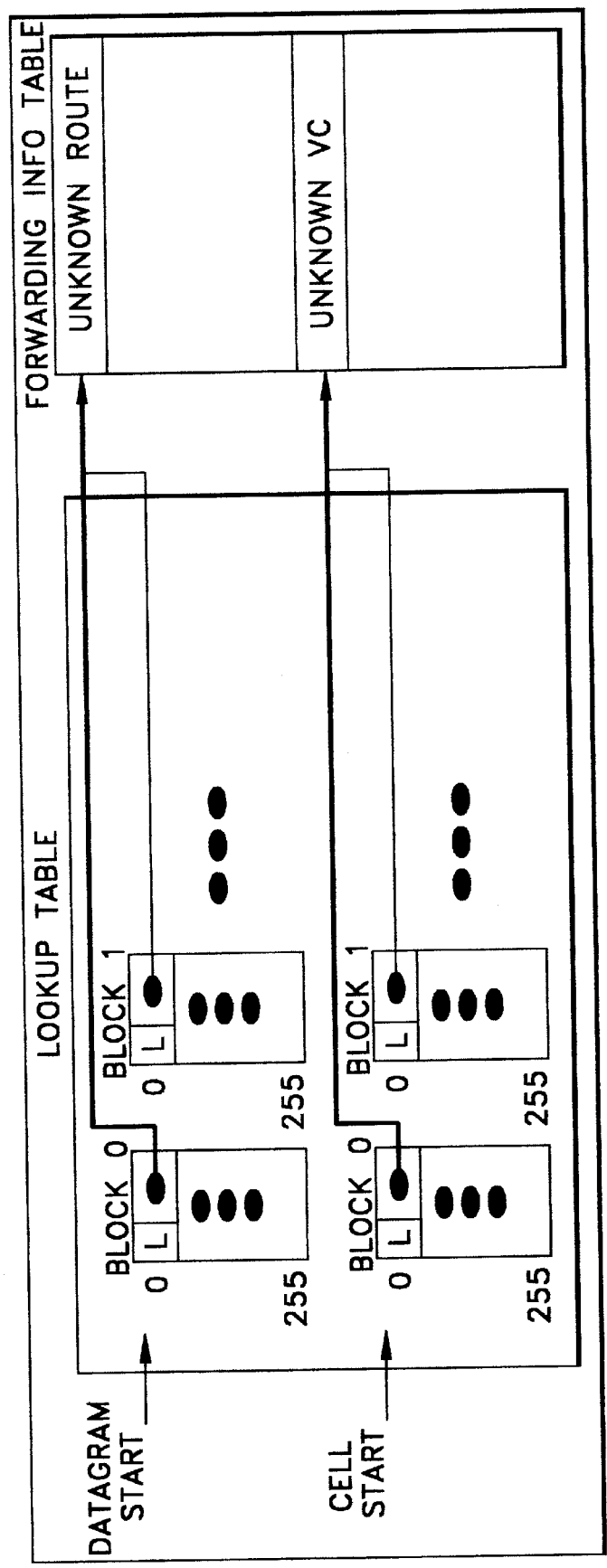
Figure 23:
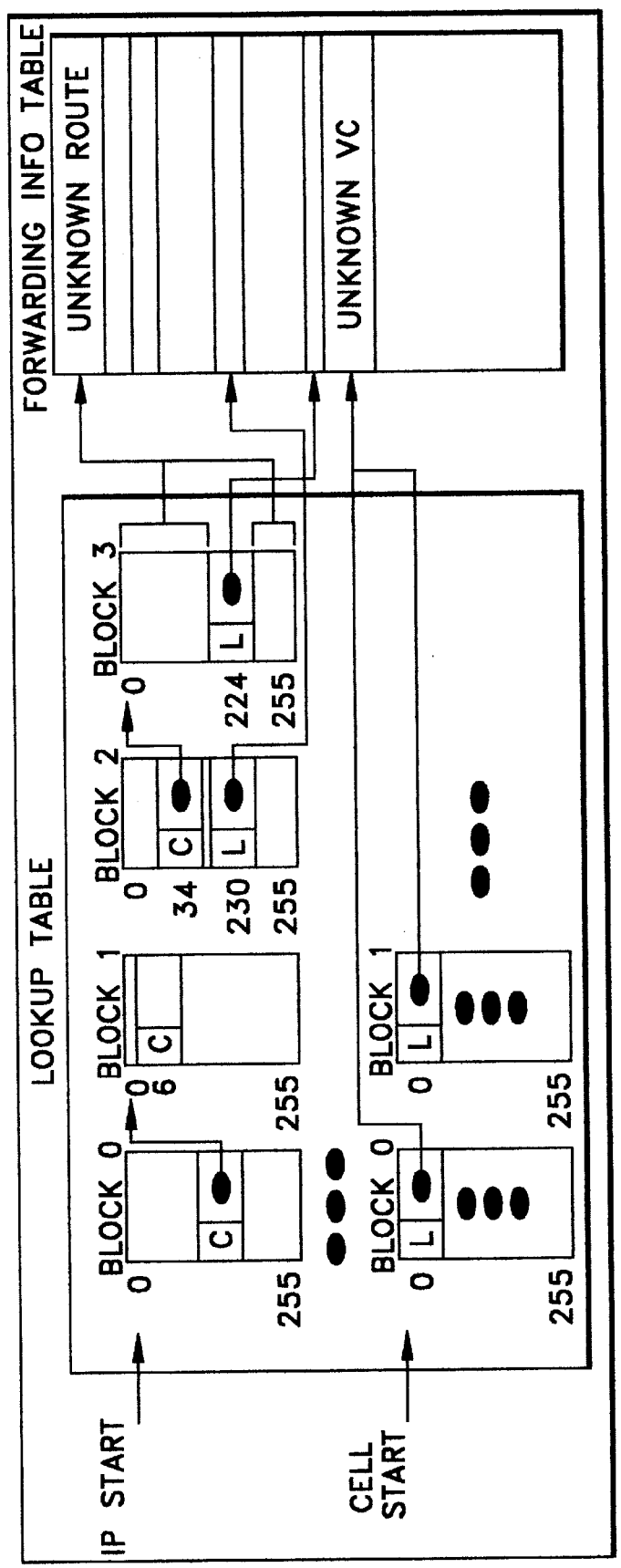
Figure 24:
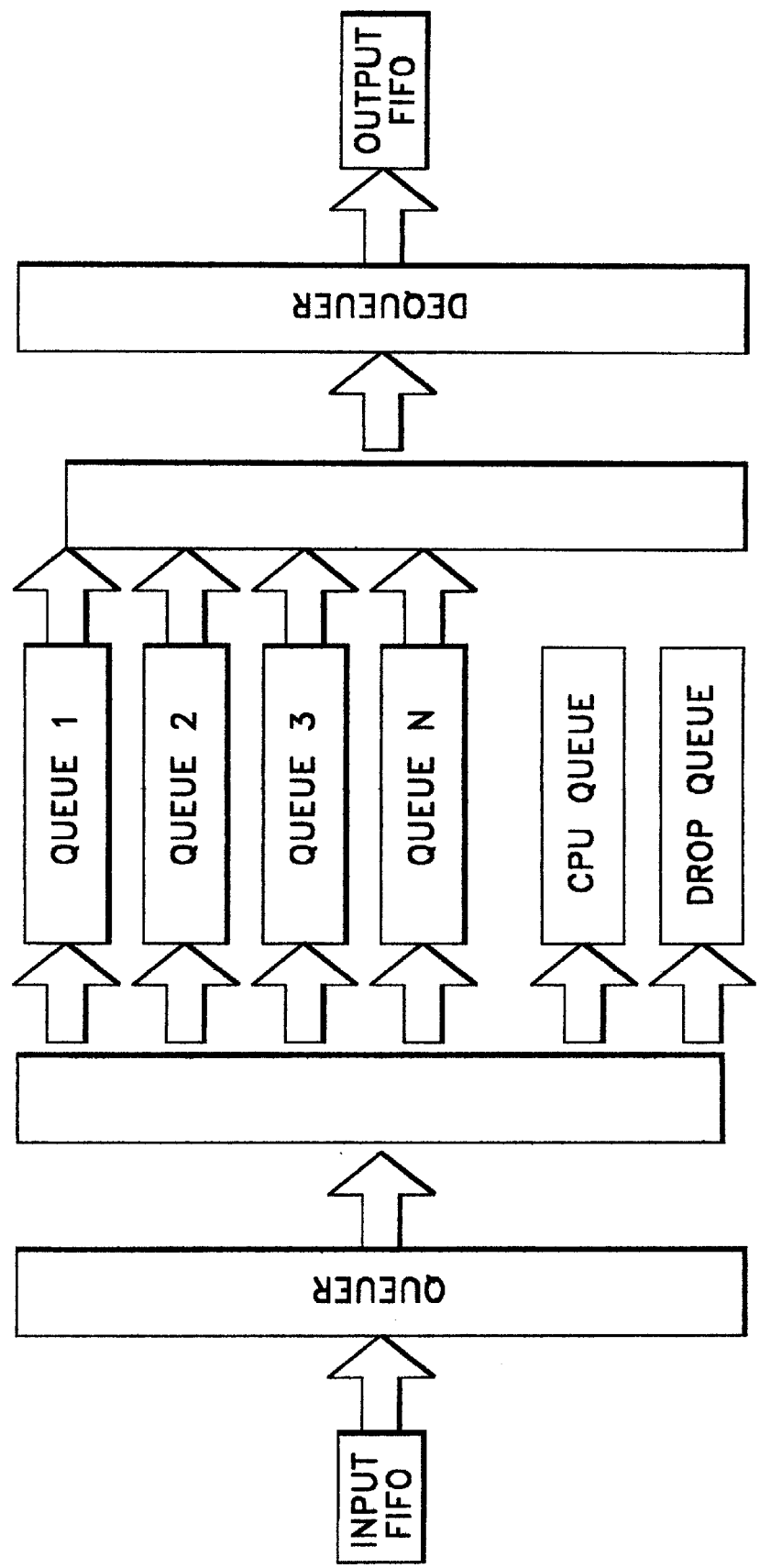

FIG. 22 presents an initialized lookup table, with all entries pointing to unknown route/cell forwarding information, and FIG. 23 illustrates the lookup table after adding an illustrative IP address (209.6.34.224/32); and FIG. 24 is a queuing diagram for scheduling system operation.

FURTHER BACKGROUND TO PREFERRED EMBODIMENTS OF INVENTION

Before proceeding to illustrate the preferred architecture of the invention, it is believed necessary to review the limitations of the prior and of current network systems, which the present invention admirably overcomes.

Current networking solutions are designed either for switching data packets or cells. As before stated, all types of data networking switches must receive data on an ingress port, make a forwarding decision, transfer data from the ingress port to the egress port and transmit that data on the appropriate egress port physical interface. Beyond the basic data forwarding aspects, there are different requirements for cell switching versus frame forwarding. As before stated, all current technology divides switching elements into three types: bridges, routers and switches, and in particular, ATM switches. The distinction between bridges and routers is blurred in that both forward datagrams and typically most routers also do bridging functions as well, thus the discussion focuses on datagram switches (i.e. routers) and ATM switches.

It is in order first to investigate the basic architectural requirements for these two types of switching devices based on current solutions, and then to present the reasons why current solutions do not provide mechanisms to allow simultaneous transfer of cells and frames without severely impacting the correct operations of either ATM switching or frame forwarding. The novel solution based on the present invention will then be clear.

Figure 2:
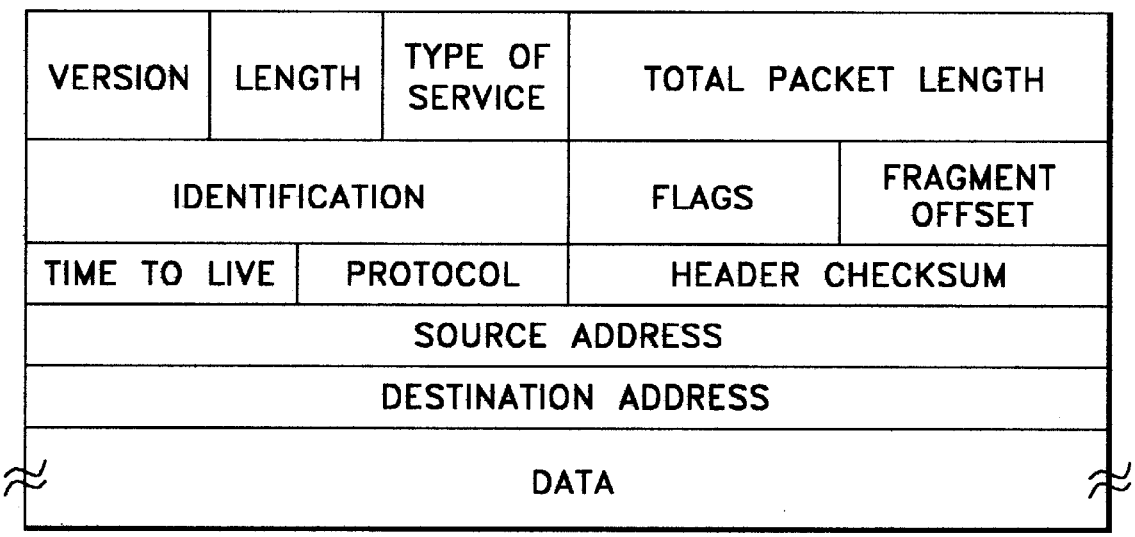
FIG. 2 is a similar diagram of an Internet Protocol (IP) frame format for 32 bit words.

Routers typically have a wide variety of physical interfaces: LAN interfaces, such as Ethernet, Token ring and FDDI, and wide-area interfaces, such as Frame Relay, X.25, T1 and ATM. A router has methods for receiving frames from these various interfaces, and each interface has different frame characteristics. For example, an Ethernet frame may be anywhere from 64 bytes to 1500 bytes, and an FDDI frame can be anywhere from 64 bytes to 4500(including header and trailer) bytes. The router's I/O module strips the header that is associated with the physical interface and presents the resulting frame, such as an IP datagram, to the forwarding engine. The forwarding engine looks at the IP destination address, FIG. 2, and makes an appropriate forwarding decision. The result of a forwarding decision is to send datagram to the egress port as determined by the forwarding tables. The egress port then attaches the appropriate network-dependent header and transmits the frame from the physical interface. Since different interfaces may have different frame size requirements, a router may be required to "fragment" a frame, i.e. "chop" the datagram into useable size. For example, a 2000 byte FDDI frame must be fragmented into frames of 1500 bytes or less before being sent out on a Ethernet interface.

Current router technology offers "best effort" service. This means that there are no guarantees that datagrams will not be dropped in a router-based network. Furthermore, because routers transfer datagrams of varying sizes, there are no per datagram delay variation or latency guarantees. Typically a router is characterized by its ability to transfer datagrams of a certain size. Thus, the capacity of a router may be characterized by its ability to transfer 64 byte frames in one second or the latency to transfer a 1500 byte frame from an ingress port to an egress port. This latency is characterized by last bit in, first bit out.

Figure 1:
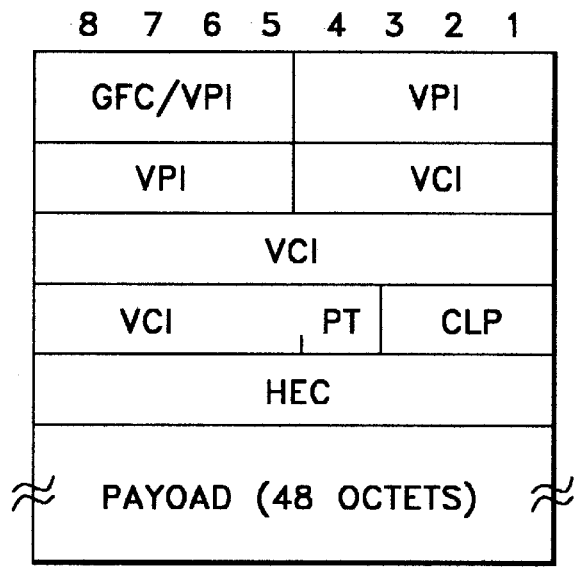

An ATM switch, by comparison, has only one type of interface, i.e. ATM. An ATM switch makes forwarding decision by looking at a forwarding table based on VPI/VCI numbers, FIG. 1. The forwarding table is typically indexed by physical port number, i.e. an incoming cell with a VPI/VCI on ingress port N gets mapped to an egress port M with a new VPI/VCI pair. The table is managed by software elsewhere in the system. All cells, no matter what the ATM Adaptation Layer (AALx), have the same structure, so that if ATM switches can forward one AAL type, they can forward any type.

In order to switch ATM cells, several fundamental criteria must be met. The switch must be able to make forwarding decisions based on control information provided in the ATM header, specifically VPI/VCI. The switch must provide appropriate QoS functions. The switch must provide for specific service types, in particular Constant Bit Rate (CBR) traffic and Variable Bit Rate (VBR). CBR (voice or video) traffic is characterized by low latency and more importantly low or guaranteed Cell Delay Variation (CDV) and guaranteed bandwidth.

The three main requirements of implementing CBR type connections over a traditional packet switch are low CDV, small Delay and guaranteed bandwidth. Voice, for example, consumes a fixed amount of bandwidth, based on the fundamental Nyquist's sampling Theorem. CDV is also part of a CBR contract, and plays a role into the overall Delay. CDV is the total worst case variance in expected arrival time and actual arrival time of a packet/cell. In so far as an application is concerned, it wants to see data arrive equidistant in time. If, however, the network cannot guarantee this equidistant requirement, some hardware has to buffer data—equal or more than the worst case CDV amount introduced by the network. The higher the CDV, the higher is the buffer requirement and hence the higher Delay; and, as illustrated earlier, Delay is not good for CBR type circuits.

Packet-based networks traditionally queue data at the egress based on priority of traffic. Regardless of how data is queued, traffic with low delay variation requirements will get queued behind one or more packets. Each of them could be maximum packet size, and this inherently contributes the most to delay variation on a packet-based network.

There are many methodologies used to manage bandwidth and priorities. From a Network Management point of view, a network manager usually likes to carve out the total egress bandwidth into priorities. There are several reasons for carving this bandwidth: e.g. it ensures the manager that control traffic (Higher Priority and Low Bandwidth) always has room on the wire even during very high line bandwidth utilization, or perhaps a CBR (Constant Bit Rate) traffic will be guaranteed on the wire, etc.

There are numerous methods to address bandwidth per traffic priority. Broad classes of these mechanisms are Round Robin Queuing, Weighted Fair Queuing and Priority Queuing. Each methodology will be explained for the sake of discussion and completeness of this document. In all cases of queuing, traffic is put into queues based on priorities, usually by a hardware engine that looks at a cell/packet header or control information associated with cell/packet as the cell/packet arrives from the backplane. It is how data is extracted/de-queued from these queues that differentiates one queuing mechanism from another.

Simple Round Robin Queuing

This queuing mechanism empties all queues in a round robin fashion. This means that traffic is divided into queues and each queue gets the same fixed bandwidth. While a clear advantage is simplicity of implementation, a major disadvantage of this queuing technique is that this mechanism completely loses the concept of priority. Priority must then be managed by buffer allocation mechanisms. The only clear advantage is simplicity of implementation.

Weighted Round Robin

This queuing mechanism is an enhancement of Simple Round Robin Queuing 'Simple Round Robin Queuing', where a weight is placed on each queue by the network manager during initialization time. In this mechanism, each priority queue is serviced based on the weight. If one queue is allocated 10% of the bandwidth, it will be serviced 10% of the time. Another queue may have 50% of the allocated bandwidth, and will be serviced 50% of the time. The major drawback is there is unused bandwidth on the wire when there is no traffic in a queue of the allocated bandwidth. This results in wasted bandwidth. There is, moreover, no association of packet size in the de-queuing algorithm, which is crucial for packet-based switches. Giving equal weight to all packet sizes throws off the bandwidth allocation scheme.

Priority Queuing

In this queuing mechanism, output queues are serviced purely based on priority. The Highest Priority Queue gets serviced first, and the Lowest Priority Queue gets serviced last. In this mechanism, Higher Priority Traffic always preempts the Lower Priority Queue. The drawback of this type of mechanism is that the Lower Priority Mechanism may result in zero bandwidth. The advantage of this mechanism, besides being simple, is that the bandwidth is not wasted; so long as there is data to send, it will be sent. There is, however, no association of packet size in the de-queuing algorithm, which is crucial for packet-based switches. Giving equal weight to all packet sizes throws off the bandwidth allocation scheme, as before noted.

Figure 5:
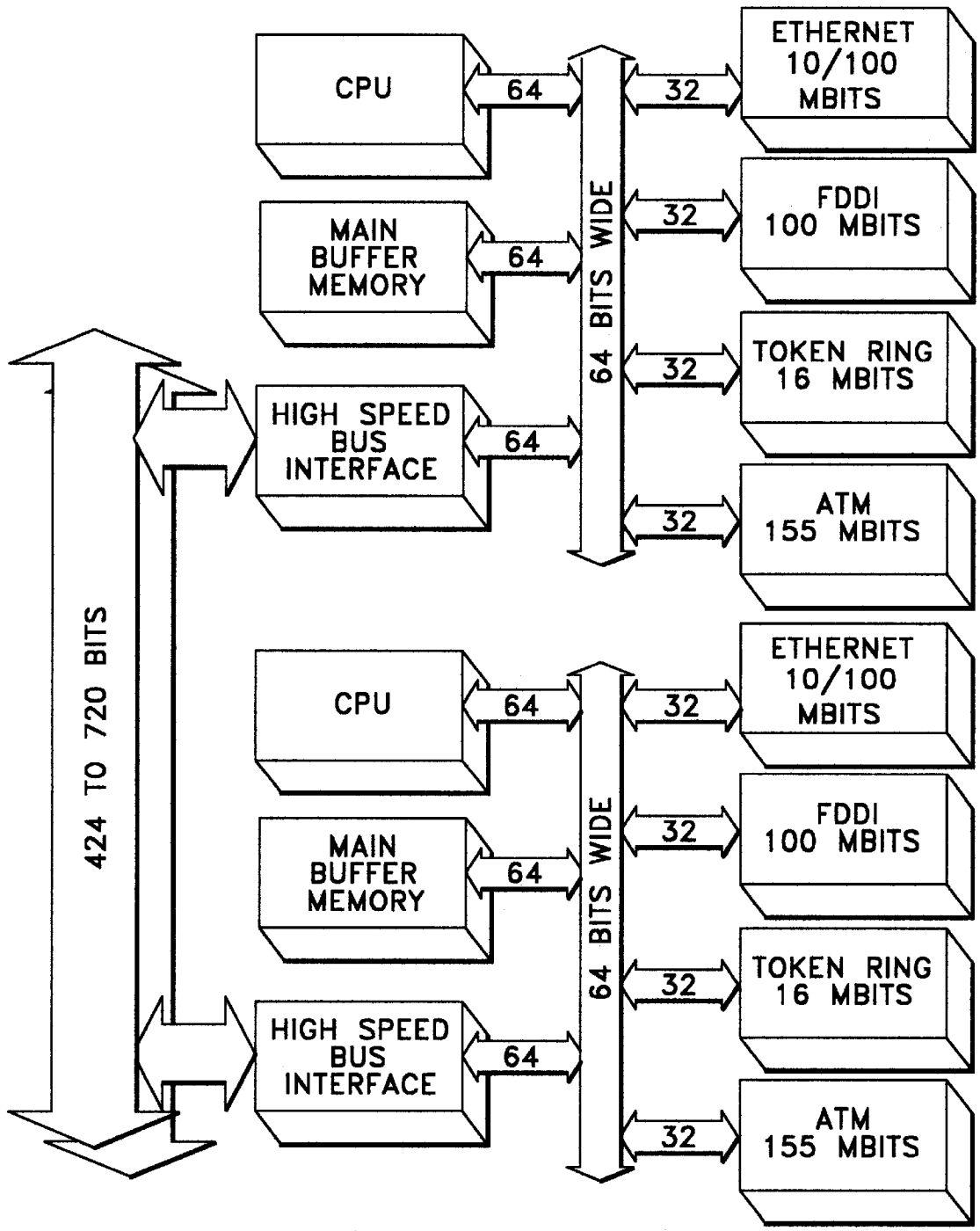
FIG. 5 is a block diagram of a traditional prior art bus-based switching architecture, and FIG. 6, its memory-based switch data flow diagram.
Figure 6:
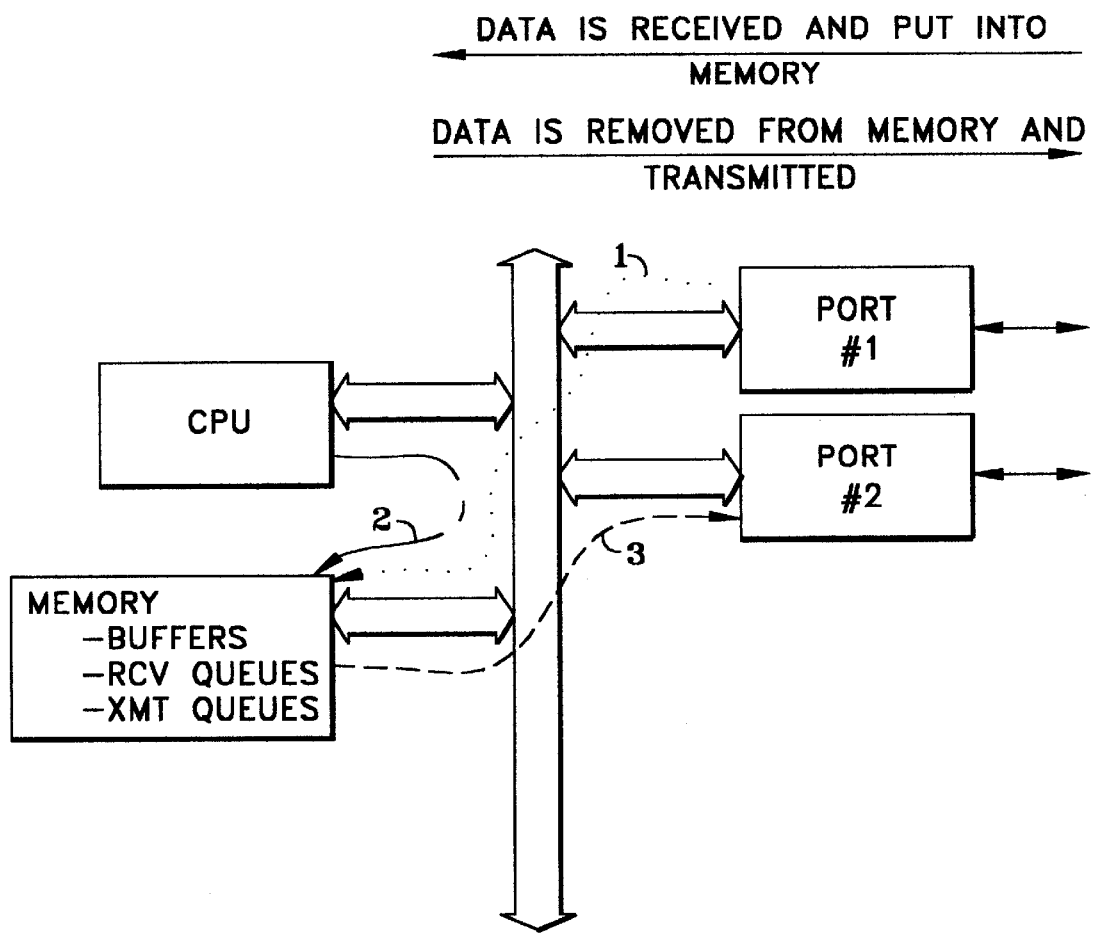
Figure 7:
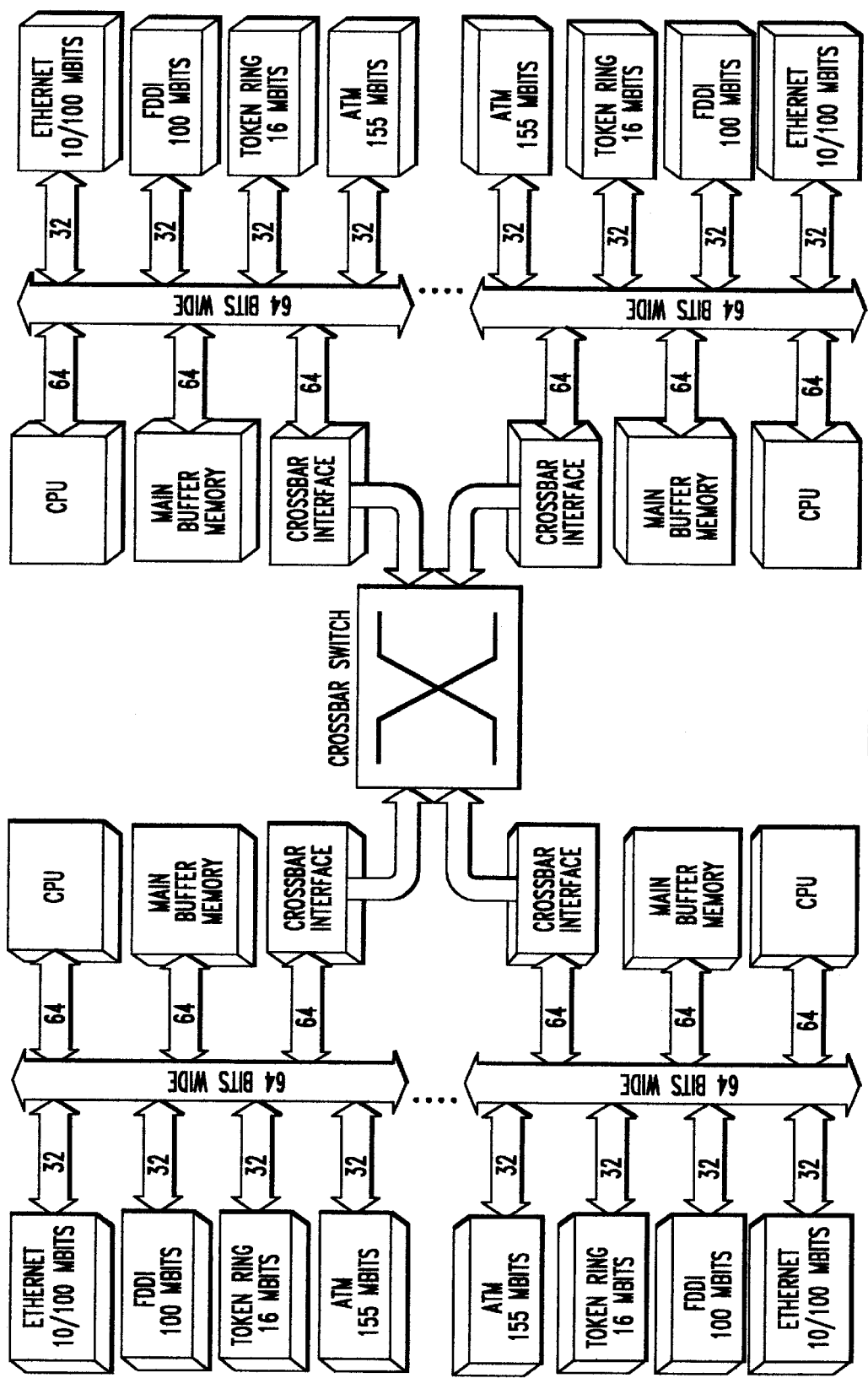
FIG. 7 is a block diagram of a traditional prior art cross-bar type switching architecture, and FIG. 8, its cross-bar data flow diagram.

From the above examples, there is a need to strike a balance between Priority Queuing and Weighted Round Robin Queuing, along with packet size. This calls for a solution provided by the present invention where high priority traffic is serviced before lower priority traffic, but each queue is serviced at least within its bandwidth allocation. In addition to the above requirement, the output buffer should be filled with data from a queue even when the bandwidth of that queue is exhausted, including with other bandwidth eligible queue data. This technique enforces bandwidth per traffic queue requirement and also does not waste bandwidth on the wire and is embodied in the invention Architectural Issues in Switch Design Current switching solutions employ two distinct solutions: 1) memory and 2) cross-bar. These solutions are illustrated in FIGS. 5 and 6 showing a traditional bus-based and memory based architecture, and in FIG. 7, showing a traditional cross-bar switching architecture. In the traditional memory-based solutions represented by FIG. 5, data must first be placed inside of main memory from the I/O card. This data transfer takes several cycles as bits are moved from the I/O module to the main memory. Since several different I/O modules must transfer data to common memory, contention for this resource occurs. Main memory provides both a buffering mechanism and a transfer mechanism for data from one physical port to another physical port. The rate of transfer is then highly dependent on the speed of the egress port and the ability of the system to move data in and out of main memory and the number of interfaces that must access main memory.

As more fully shown in FIG. 6, the CPU interfaces through a common bus, with memory access, with a plurality of data-receiving and transmitting I/O ports #1, #2, etc., with the various dotted and dashed lines showing the interfacing paths and the shared memory, as is well known. As pointed out previously, the various accesses of the shared memory result in substantial contention, increasing the latency and unpredictability, which is already substantial in this kind of architecture because the processing of the control information cannot begin until the entire packet/cell is received.

Furthermore, as the accesses to the shared memory are increased, so does the contention; and as the contention is increased, this results in increasing the latency of the system. In the traditional memory-based switch data flow diagram of FIG. 6, thus, where the access time per read or write to the memory is equal to M, and the number of bits for a memory access is W, the following functions occur:

There is the write of data from the receive port #1 to shared memory. The time to transfer a packet or cell is equal to $((B*8)/W)*M$, where B is equal to the number of bytes for the packet or cell, M is the access time per read or write to the memory and W is the number of bits for a memory access. As the packet gets larger so does the time to write it to memory.

This means that if a packet is destined to an ATM interface as in FIG. 5, followed by a cell, the cell is delayed by the amount of transfer time from main memory, and in the worst case this could be N packets (where N is the number of packet, non-ATM interfaces) including the contention among other reads and writes on the bus. If, for example, B=4000 bytes and M is 80 nanoseconds (for a 64 bit-wide bus for DRAM access), then $((4000*8)/64)* 80=40,000$ nanoseconds for a packet transfer queued before a cell can be sent, and OC 48 is 170 nanoseconds per 64 byte cells. This is only if there is no contention on the bus whatsoever. In the worst case, if a switch has 16 ports and all the ports are contending simultaneously, then to transfer the same packet would require 640,000 nanoseconds just to get into the memory, and the same amount to get out—a total time of about 1.3 milliseconds. This occurs if between each write into memory, another port has to write to memory as well. So for n=16 ports, n−1, or 15 ports have to gain access to memory. This means that 15 ports*80 nanoseconds=1200 nanoseconds are used by the system before the next transfer into memory of the original port can occur. Since there are 4000 bytes*8 bits/byte)/64 bits=500 accesses, each access is separated by 1200 nanoseconds, and the full transfer takes 500*1200=600,000 nanoseconds. So the total is system time plus actual transfer time which is 600,000 nanoseconds+40,000 nanoseconds=640,000 nanoseconds for the transfer into memory, and another 640,000 nanoseconds out of memory. This calculation, moreover, does not include any CPU contention issues or delay because of egress port busy, which would make this calculation even larger.

There are similar disadvantages in traditional cross-bar based solutions as shown in FIG. 7, before referenced, where there is no main memory, and buffering of data occurs both at the ingress port and egress port. In the memory-based design of FIGS. 5 and 6, buffer memory is shared across all ports, making for very efficient utilization of memory on the switch. In the cross-bar approach of FIG. 7, each port must provide a large amount of memory, so that the overall memory of the system is large as there is no common sharing of buffers. The cross-bar switch is only a conduit for the transfer of data from one physical port on the system to another physical port on the system. If two ports are simultaneously to transfer data to one output port, one of the two input ports must buffer the data thereby increasing the latency and unpredictability as the data from the first input port is transferred to the output port. The advantage of a cross-bar switch over a memory-based switch, however, is the high rate of data transfer from one point to another without the inherent limitation of main memory contention on the memory-based switch.

Figure 8:
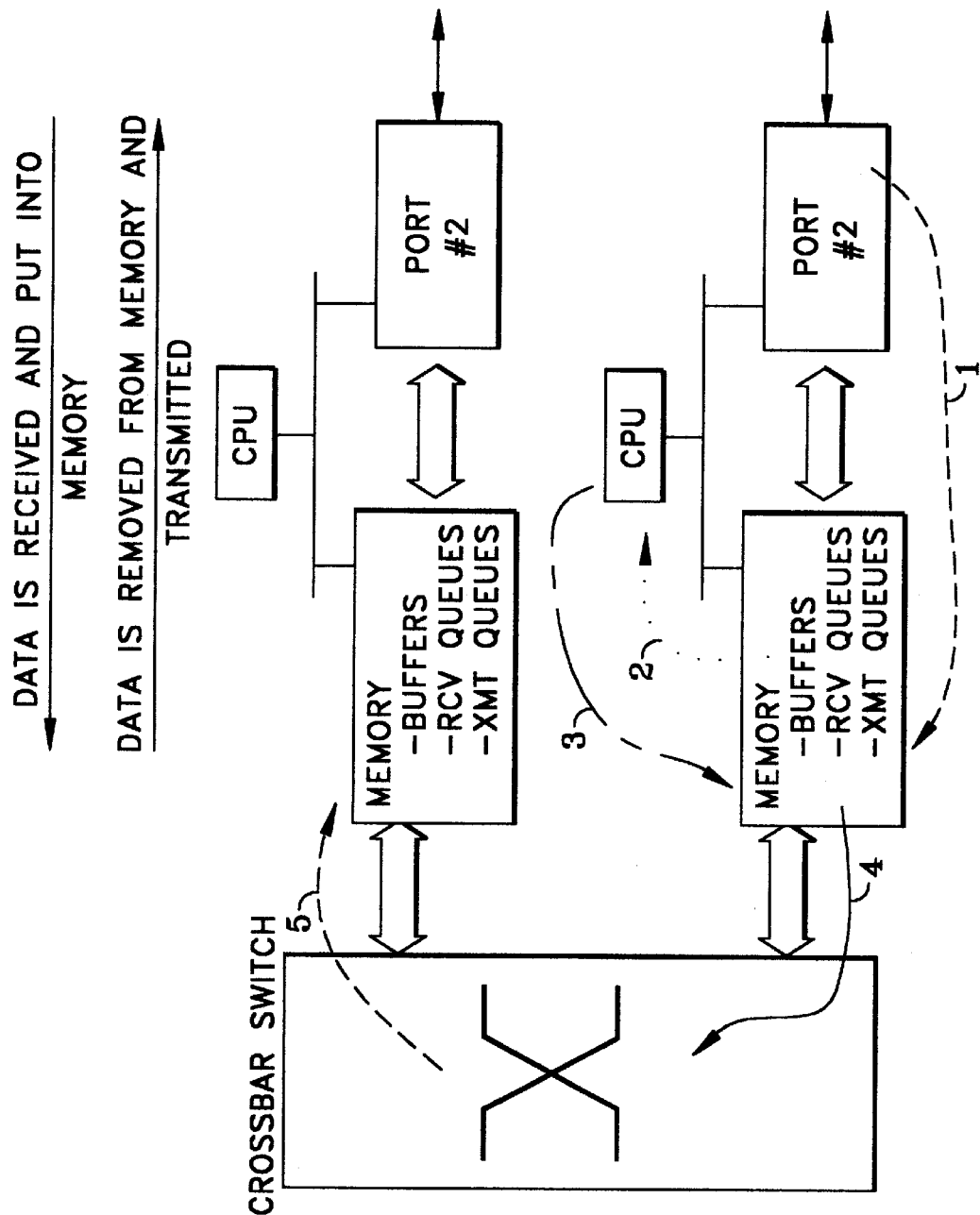

In the traditional cross-bar switching architecture system of FIG. 7, the CPU interfaces through a common bus, with memory access, to an interface with the various dotted and dashed lines of FIG. 8 showing the interfacing paths and the shared memory, as is well known. The CPU makes a forwarding decision based on information in the data. The data must then be transmitted across the cross-bar switch fabric to the egress port. But if other traffic is being forwarded to that egress interface, then the data must be buffered in the ingress interface for so long as the amount of time it takes to transfer the entire cell/packet to the egress memory. There is:

A. Write of data from the receive port #1 to local memory. The time to transfer a packet or cell is equal to $((B*8)/W)*M$, where B is equal to the number of bytes for the packet or cell, M is the access time per read or write to the memory and W is the number of bits for a memory access. As the packet gets larger so does the time to write it to memory.

B. Write of data from the receive port #1 to local memory of egress port #2. The time to transfer a packet or cell is equal to $((B*8)/W)*M+T$, where B is equal to the number of bytes for the packet or cell, M is the access time per read or write to the memory, W is the number of bits for a memory access and T is the transfer time of the cross-bar switch. As the packet gets larger, so does the time to transfer it across the cross bar switch and write it to local memory.

For a packet transfer followed by a cell transfer to an egress port, the calculation is the same as for the memory-based solution of FIGS. 5 and 6. The packet must be transferred to local memory at the same speeds as for the memory-based solution. The advantage that there is no contention for central memory, does not alleviate the problem that a packet transfer in front of a cell transfer can cause delays that prevent the proper functioning of very fast interface speeds.

The goal is to create a switching device running at high speeds (i.e. SONET defined rates) that provides the required QoS. The device should be scalable in terms of speed and ports, and the device should allow for equal-time transfer of cells and frames from an ingress port to an egress.

Figure 3:
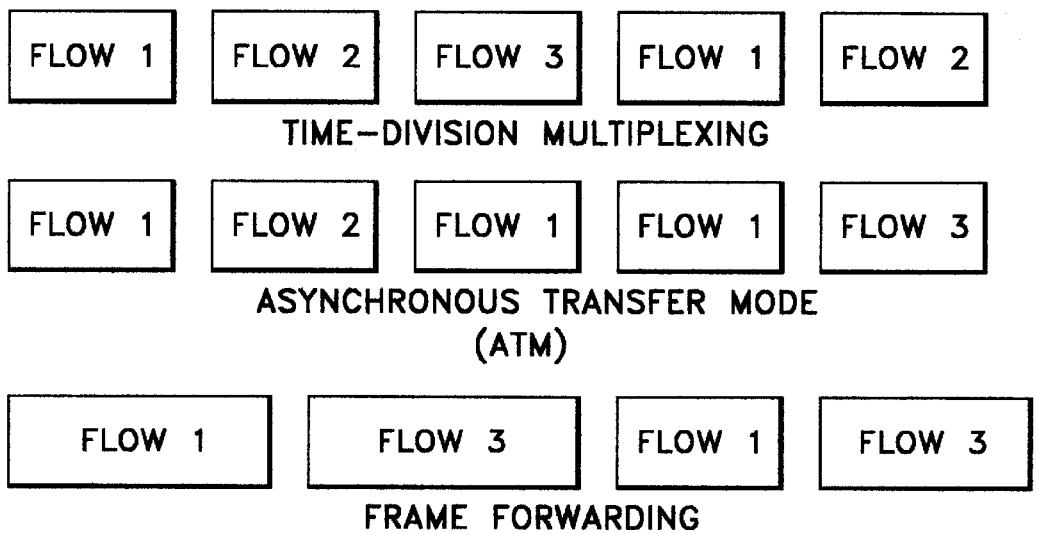
FIG. 3 is a flowchart comparing Time-Division Multiplexing (TDM), ATM and Packet Data frame forwarding.

While current designs have started to come up with very high speed routers, they have not, however been able to provide all the ATM service requirements, thus still maintaining a polarized set of networking devices, i.e. routers and ATM switches. An optimal solution is one that achieves very high speeds and that provides the required QoS support and has interfaces that merge ATM and Packet-based technologies on the same interface, FIG. 3. This will allow the current investment in either networking technology to be preserved, yet satisfy bandwidth and QoS demands.

The issues in merging interfaces on a data switch port that accepts ATM cells and treats certain ATM cells as packets and others as ATM flows, accepts only packets on other interfaces and only cells on yet another set of interfaces, is shown in later-discussed FIG. 4. These issues are three fold: a) Forwarding decision at the ingress interface for packet and cells, b) switching packet and cells through the switch fabric and, c) managing egress bandwidth on packet and cells. The present invention, based on this technique of the previously cited co-pending applications, explains how to create a general data switch that merges the two technologies (i.e. ATM switching and packet switching) and solves the three issues listed above.

Interface Issues Switch Designs

The purpose of this section is to compare and contrast ATM and Packet-based switch designs and various interfaces on either type of switch design. Specifically it identifies problems with both devices as they pertain to forwarding packet or cells; i.e. issues with ATM switches forwarding packet, and issues with Packet switches forwarding cells, FIG. 3.

Typical Design of an ATM Switch

As previously explained, defined within the ATM standard there are multiple ATM Adaptation Layers (AAL1–AAL5), each one specifying a different type of service from a wide spectrum of services; namely, Constant Bit Rate (CBR) to Unspecified Bit Rate (UBR). Constant Bit Rate (AAL1) contract guarantees minimal cell loss with low CDV, while Unspecified Bit Rate contract specifies no traffic parameters, and no quality of Service guarantees. For the purposes of this invention it is convenient to limit the discussion to AAL1 (CBR) and AAL5 (Fragmented Packets).

Figure 9:
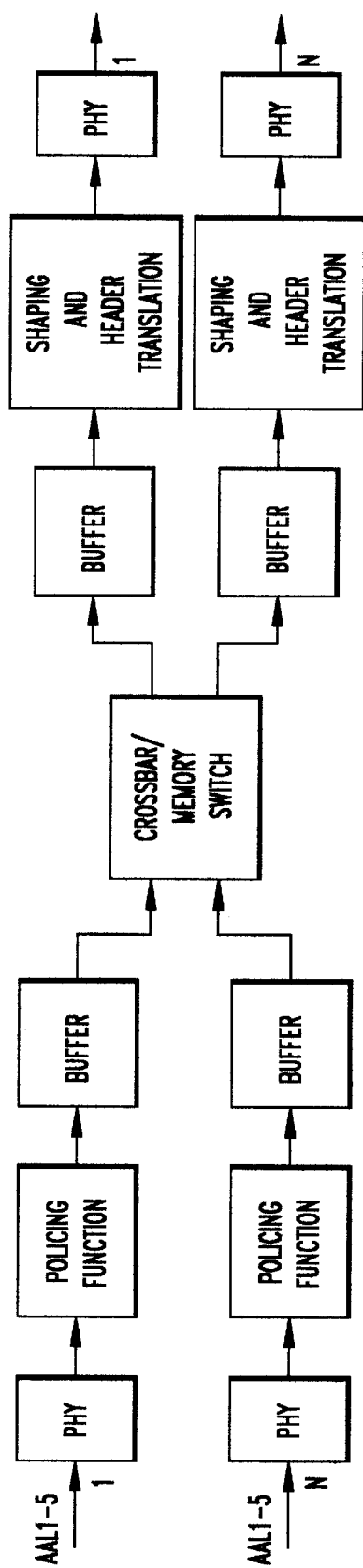
FIGS. 9–11 are interface diagrams illustrating, respectively, a cell switch with a native interface card, a packet interface on cell switch, and an AAL5 packet interface on cell switch, all with a cross-bar or memory switch.

FIG. 9 illustrates cell switching with native cell interface cards, showing different modules of a generic ATM Switch with native ATM interfaces. The cells arriving from the physical layer module (PHY) are processed by a module called Policing Function Module, which validates per VCI established contracts (services) for incoming cells; e.g Peak Cell Rate, Sustained Cell Rate, Maximum Burst Rate. Other parameters such as Cell Delay Variation (CDV) and Cell Loss Rate (CLR) are guarantees provided by the box based on the actual design of the cards and the switch. The contracts are set by the network manager or via ATM signaling mechanisms. Cell Data from the policing function then goes, in the example of FIG. 9, to a Cross Bar-type (FIG. 7) or Memory-based Switch (FIG. 5). Cells are then forwarded to the egress port which has some requirements of shaping traffic to avoid congestion on the remote connection. To provide egress shaping, the design will have to buffer data on the egress side. Since ATM connections are based on a point-to-point basis, the Egress shaper module also has to translate the ATM Header. This is because the next hop has no relationship to the ingress VCI/VPI.

Native Packet Interface on ATM Switch

As mentioned in the 'Background' section, if an ATM switch is to provide a method that facilitates the routing of packets, there have to be at least two points between two hosts where packets and cells networks meet. This means that current cell switching equipment has to carry interfaces that have native packet interfaces, unless the switch is sitting deep in the core of the ATM network. It is now in order, therefore, to examine the design of such a packet interface that connects to the ATM switch.

Figure 10:
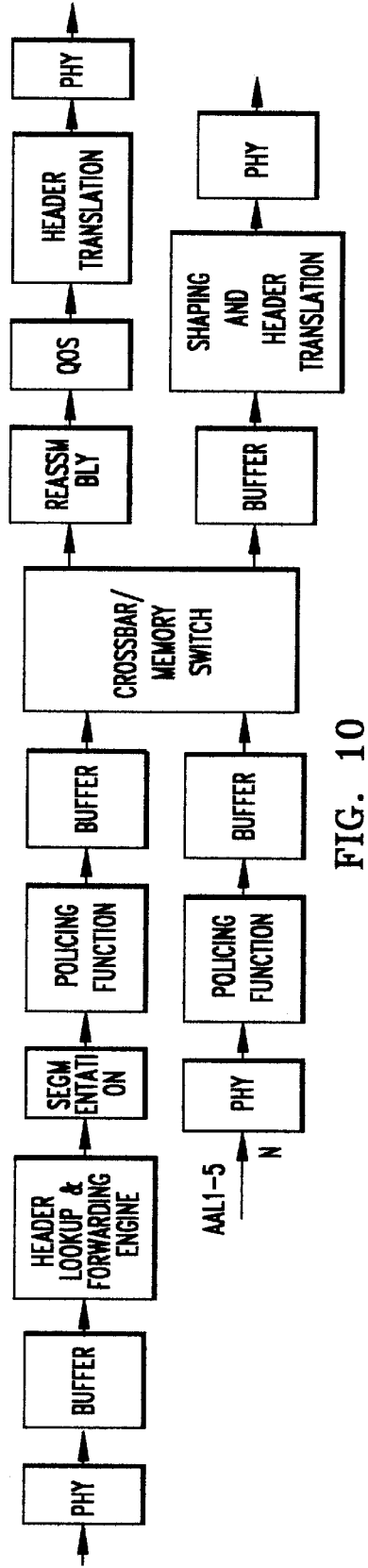

A typical Packet interface on an ATM Switch is shown in FIG. 10, elaborating on packet interface on the cell switch. The physical interface would put incoming packets into a buffer and then they are fed to the "Header Lookup and Forwarding Engine". The packet-based forwarding engine decides the egress port and associates a VCI number for cells of that packet. The packet then gets segmented into cells by the Segmentation Unit. From there on, the packet is treated just as in the native Cell Switching case, which involves going through a policing function and to the Switch Buffer before entering the switch. On the egress side, if the cells enter a cell interface, then the processing is just as explained above (in the native cell interface on ATM switch). If the cells enter a packet interface, then the cells have to be reassembled into packets. These packets are then put into various priority queues and then emptied as in the packet switch.

Two types of packet interfaces on the ATM Switch should be examined.

AAL5 Interface on ATM Switch

A Router connected to ATM Switch could segment packets before sending the packet to the ATM Switch. In that case, packets would arrive at the ATM Switch in AAL5 format, before described. If the ATM Switch were to act as a Router and an ATM Switch, it would have to reassemble the AAL5 Packet and perform a routing decision on it. Once the ATM Switch/Router makes the forwarding decision on the AAL5 packet, it would then push it through the ATM Switch after segmenting it again.

Figure 11:
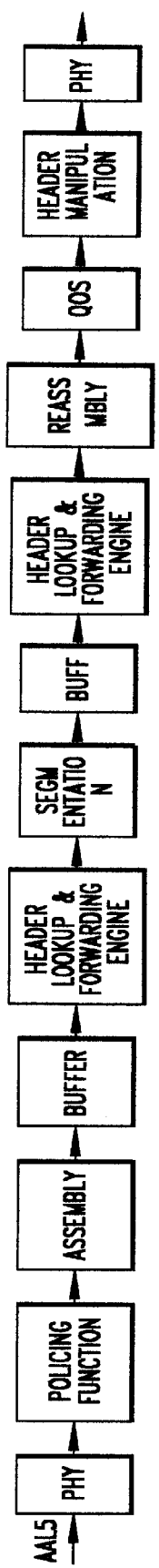

In AAL5, perfect interface on an ATM Switch is shown in FIG. 11. Incoming AAL5 cells are first policed on a per VCI based to ensure that the sender is honoring the contract. Once the policing function is done, an Assembler will assemble the cells of a VCI into packets. These packets are then forwarded to the forwarding engine, which makes the forwarding decision on the assembled packet and some routing algorithm. The packet then travels the ATM Switch as mentioned in the Packet Interface on ATM Switch section, above.

Difficulties in Processing Packets on Cell Switch

Keeping the goal of the present invention in mind, i.e. to achieve strict QoS parameters such as CDV and latency and packet loss, this section will list the difficulties of attempting to design for packets through a traditional cell switch.

According to FIG. 11, once the incoming AAL5 segmented packets are assembled and a forwarding decision is made, they are resegmented in the "Segmentation Unit". Across the Switch, the AAL5 cells are then reassembled into packets before they are shipped on the egress wire. This segmentation and reassembly adds to the delay and unpredictable and unmeasurable PDV (Packet Delay Variation) and cell loss. As earlier mentioned, for packets to be provide QoS, it would need to support contract that includes providing measurable PDV and delay. Delay is caused due to the fact the cells have to be reassembled. Each reassembly would have to, in best case, buffer an entire packet worth of data before calling it complete and sending it to the QoS section. For a 8000 byte packet, for example, this could result in 64 use delay in buffering on a 1 Gigabit switch.

The PDV for a packet through a cell switch is even more of a concern than the additional delay. The assembly process can be processing multiple packets at the same time from various ingress ports and packets, and this causes an unpredictable amount of PDV, essentially based on switch contention and the number of retries of sending cells from ingress to egress.

Cell loss through the switch causes packets to get reassembled incorrectly and therefore adversely affects applications that are real-time content specific. Most file transfer protocols do recover from a dropped packet (due to dropped cells), but it causes more traffic on the switch due to retransmissions.

In summary, passing packets through an ATM switch does not provide packets with the same CDV and latency characteristics as cells. It simply provides a mechanism for passing a packet path through a cell switch.

Design of Packet Switch

A traditional Packet Switch is shown in FIG. 11 with native packet interface cards. Packets are forwarded to the Forwarding Engine via the physical interface. The Forwarding Engine makes a routing decision based on some algorithm and the header of the packet. Once the egress port is decided, the packet travels to the egress via the Packet Switch, which could be designed in one of many ways (e.g. N by N busses, large central memory pool, etc.). On egress, the packets end up on different traffic priority Queues. These Queues are responsible for prioritizing traffic and bandwidth management.

Cell Interface on Packet Switch

The traditional packet switch, shown in FIG. 13 with AAL5 interfaces, provides a mechanism to allow cells to pass through the box so long as the cells are of AAL5 type. There is no practical way of creating a virtual cell switch through a traditional packet switch, and part of the present invention deals with the requirements of such an architecture.

After AAL5 cells are policed for contract agreements, they are assembled into packets by an Assembly module. The packets thus created are then processed exactly like native packet interfaces. On the egress side, if packets have to go out of the Switch as AAL5 cells, they are first segmented and then header translated. Finally they are shaped and sent out.

Difficulties in Processing Cells on Packet Switch:

There are problems that a cell flow faces as it traverses a traditional packet switch. It is extremely difficult for a traditional data switch, such as a router, to support the QoS guarantees required of ATM. To illustrate the point, reference is made to the diagram shown in before-described FIG. 13. One of the biggest challenges for a packet switch is to support AAL1 cells. The simple reason is that the traditional Packet-based header Lookup and Forwarding engines do not simultaneous recognize cells and packets; therefore, AAL5 cells which can be converted into packets are supported. This is a severe restriction in the capability of the switch.

Among the features of cells, are the CDV and the delay characteristics. Pushing cells through a traditional packet switch adds more delay and an unpredictable CDV. The packet switch, as is inherent in its name, implies that packets of various sizes and numbers are queued up on the switch. Packetized cells would then have no chance of maintaining any type of reasonable QoS through the switch.

Preferred Embodiment(s) of the Invention

Figure 4:
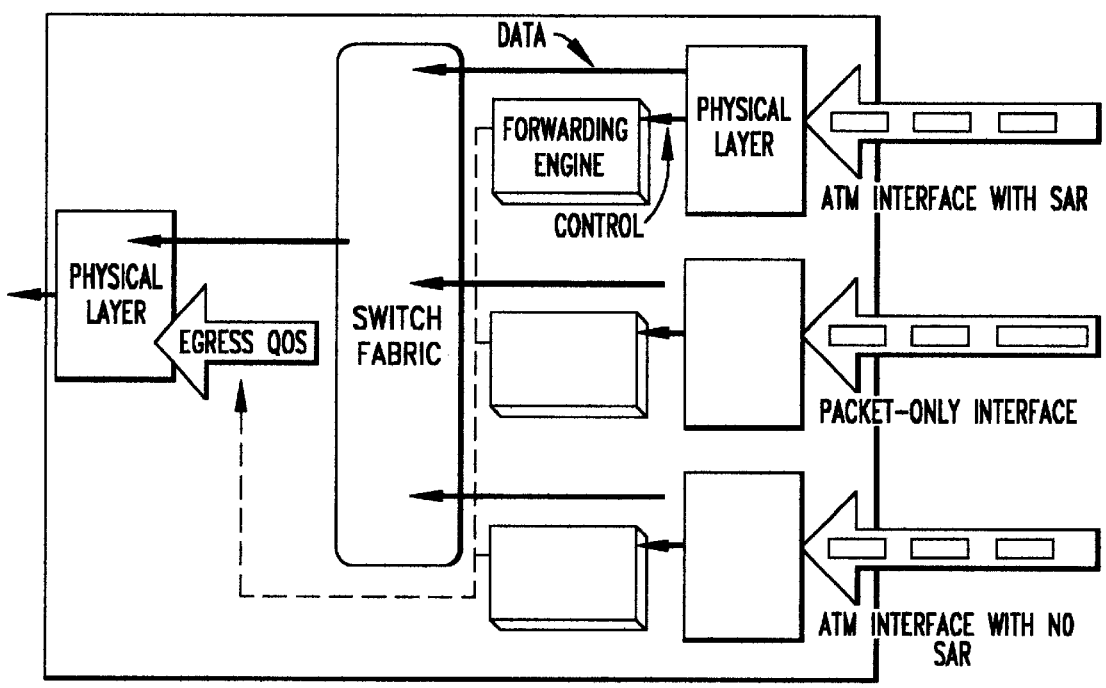
FIG. 4 is a block diagram of the switch of the invention with the cell and packet interfaces.

The present invention, exemplarily illustrated in FIGS. 4 and 14, and unlike all these prior systems, optimizes the networking system for transmitting both cells and frames without internally converting one into the other. Furthermore, it maintains the strict QoS parameters expected in ATM switches, such as strict CDV, latency and cell loss. This is achieved by having a common ingress forwarding engine that is context independent, a switch fabric that transfers cells and frames with similar latency, and a common egress QoS engine—packets flowing through the architecture of the invention acquiring cell QoS characteristics while the cells still maintain their QoS characteristics.

The main components of the novel switch architecture of the invention, sometimes referred to herein by the acronym for the assignee herein, "NeoN," as shown in FIG. 14, comprise the ingress part, the switch fabric and the egress part. The ingress part is comprised of differing physical interfaces that may be cell or frame. A cell interface furthermore may be either pure cell forwarding or a mixture of cell and frame forwarding where a frame is comprised of a collection of cells as defined in AAL5. Another part of the ingress component is the forwarding engine which is common to both cells and frames. The switch fabric is common to both cells and frames. The egress QoS is also common to both cells and frames. The final part of egress processing is the physical layer processing which is dependent on the type of interface. Thus, the NeoN switch architecture of the invention describes those parts that are common to both cell and frame processing.

The key parameters required for ATM switching, as earlier explained, and that are provided even in the case of simultaneous packet switching are predictable CDV, low Latency, low Cell Loss and bandwidth management; i.e. providing a guaranteed Peak Cell Rate (PCR). The architecture of the invention, FIGS. 4 and 14, however, contains two physical interfaces AAL5/1 and packet interface at the ingress and egress. The difference between the two types of interface is the modules listed as "Per VC Policing Function" and "Per VC Shaping". For cell interfaces (AAL1–5), the system has to honor contracts set by the network manager as per any ATM switch and also provide some sort of shaping on per VCI bases at the egress. Besides those physical interface modules, the system is identical for a packet or a cell interface. The system is designed with the concept that once the data traverses the physical interface module, there should be no distinction between a packet and cell. FIG. 14 lists the core of the architecture which has three major blocks, namely, "Header Lookup and Forwarding Engine", "QoS", and "Switch" fabric, that handle cells and packets indiscriminately. The discussion, as it relates to this invention, lies in the design of these three modules which will now be discussed in detail.

Switch Fabric

The inventions presented in before-referenced co-pending U.S. patent applications Ser. No. 581,467, and Ser. No. 900,757, both of common assignee herewith, optimize the networking system for minimal latency, and can indeed achieve zero latency even as data rates and port densities are increased. They achieve this equally well, moreover, for either 53 byte cells or 64 byte to 64K bytes packets through extracting the control information from the packet/cell as it is being written into memory, and providing the control information to a forwarding engine which will make switching, routing and/or filtering decisions as the data is being written into memory.

Native Cells through the Switch

The switch cells (AAL1/5) of FIG. 14 are first policed at 2 as per the contract the network manager has installed on a per VCI base. This module could also assemble AAL5 cells into packets on selected VCI. Coming out of the policing function 2 are either cells or assembled packets. Beyond this juncture of the data flow, there is no distinction between a packet or a cell until the data reaches the egress port where data has to comply with the interface requirements. The cells are queued up in the "NeoN Data Switch" 4 and the cell header is examined for destination interface and QoS requirements. This information is passed on to the egress interface QoS module 6 via a Control Data Switch, so-labeled at 8, The QoS for a cell-type interface will simply ensure that cell rates beyond the Peak Cell Rate are clipped. The cells are then forwarded to the "Per VCI Shaping" module 10, where the cells are forwarded to the physical interface after they are shaped as per the requirements of the next hop switch. Since the QoS module 6 does not know from the control data whether a packet or a cell is involved; it simply requests the data from the NeoN Switch into the "Buffer 12." The control data informs the "Per VCI shaping" block 10 to do either header translation if it were a cell going into another VCI tunnel, and/or segmentation if the data was a packet going out on a cell interface and/or reform shaping as per the remote end requirements.

Native Packets through the NeoN Switch

As packets enter the interface card, the packet header is examined by a Header Lookup and Forwarding Engine module 14 while the data is sent to the NeoN data switch 4. The Ingress Forwarding Engine makes a forwarding decision about the QoS and the destination interface card based on the incoming packet header. The Forwarding Engine 14 also gathers all information regarding the data packet, like NeoN Switch address, Packet QoS, Egress Header Translation information, and sends it across to the egress interface card. This information is carried as a control packet to the egress port through the small non-blocking control data switch 8 to the Egress QoS module 6, which will queue data as per the control packet and send it to the module listed PHY at the egress. If the packet were to egress to a cell interface, the packet will be segmented, then header translated and shaped before it leaves the interface.

Advantages of the NeoN Switch Architecture of the Invention

As seen above, cell and packet flow through the box without any distinction except at the physical interfaces, such that if cell characteristics are maintained, then packets have the same characteristics as the cells. The packets may thus have measurable and low PDV (Packet Delay Variation) and low latency, with the architecture supporting packet switching with cell characteristics and yet interfacing to existing cell interfaces.

While the traditional packet switch is unable to send non-AAL1 cells as before explained, AAL5 cells also suffer an unpredictable amount of PDV and delay—this being obviated by the NeoN Switch of the invention. Packets through a traditional ATM Switch also suffer the same long delays and unpredictable CDV—again, not the case in the NeoN Switch of the invention. The modules that make this type of hybrid switching of the invention possible include the Ingress Forwarding Engine, the Egress QoS, and the Switch Fabric.

Ingress Forwarding Engine Description

Figure 15:
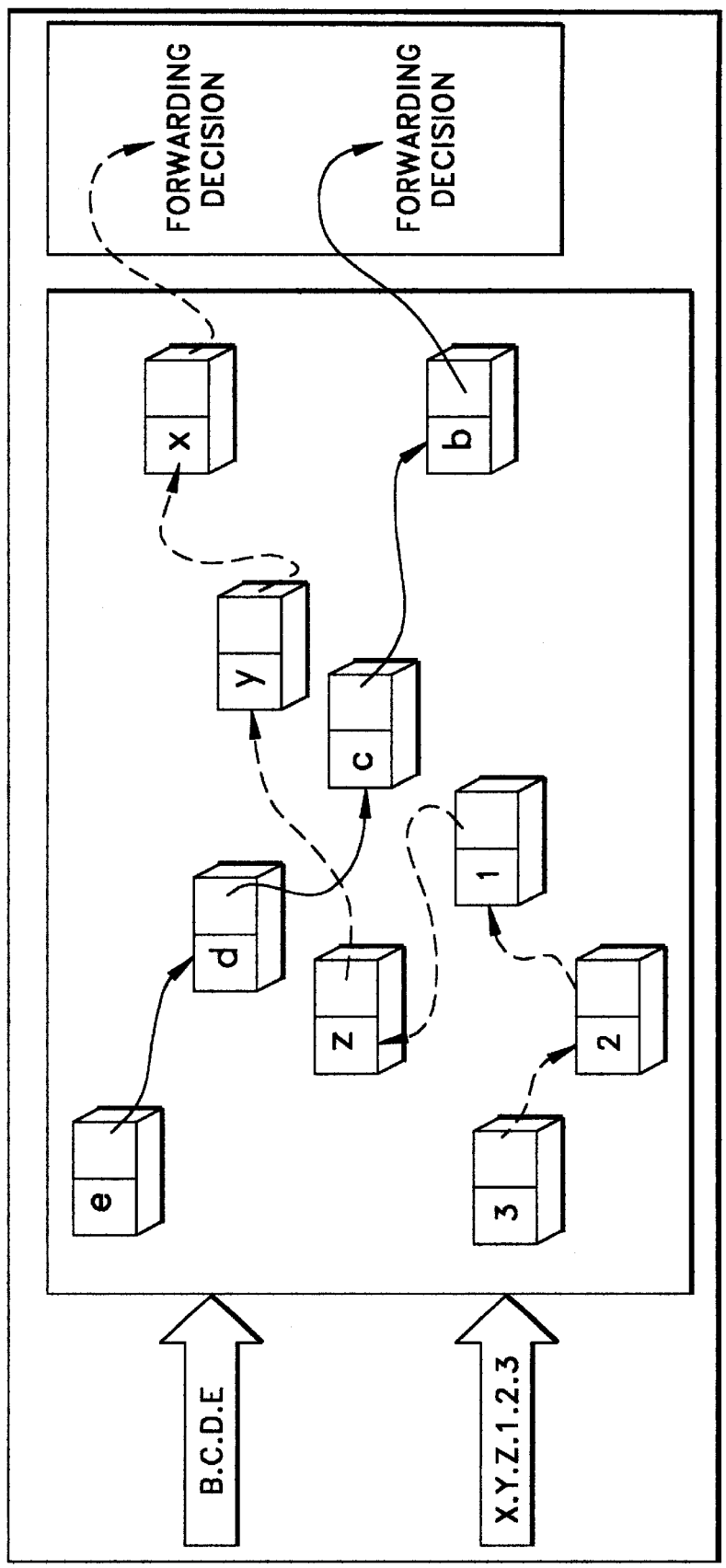
FIGS. 15 and 16 are diagrams respectively of extended parsing function flows for forwarding decisions and an overview of such functions and FIG. 17 is a diagram of the forwarding elements.
Figure 16:
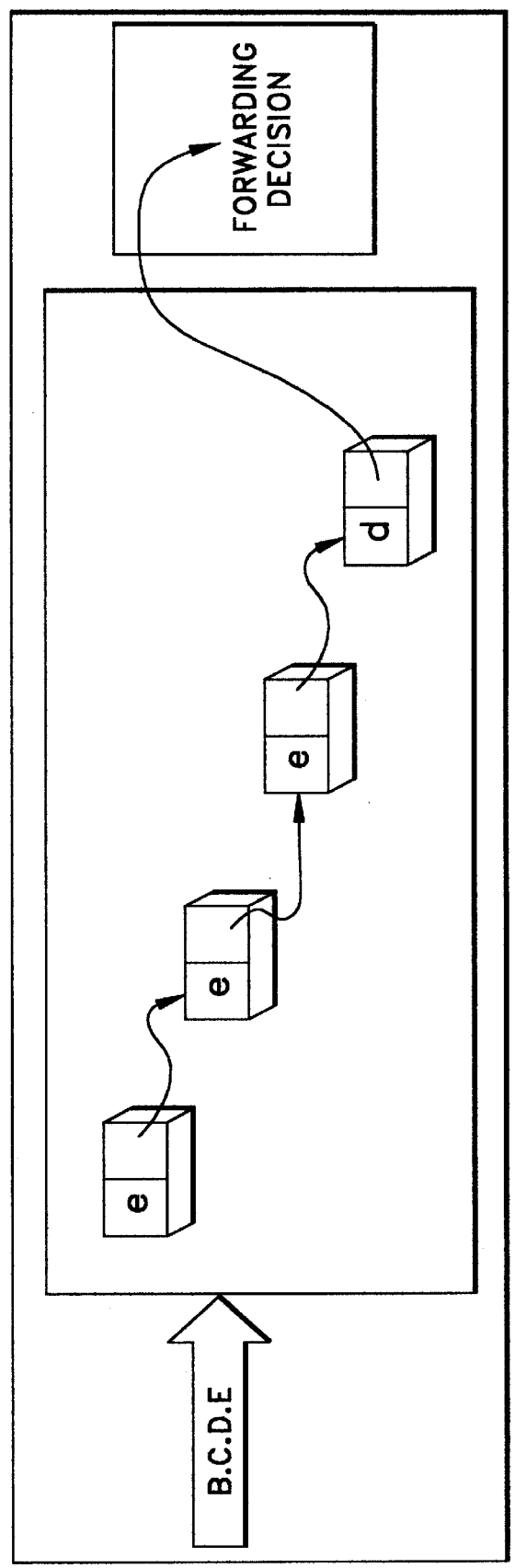

The purpose of the Ingress Forwarding Engine 14, FIG. 14, is to parse the input frame/cell and, based on predefined criteria and contents of the frame/cell, make a forwarding decision. This means that the input cell/frame is compared against items stored in memory. If a match is determined, then the contents of the memory location provides commands for actions on the cell/frame in question. The termination of the search, which is an iterative process, results in a forwarding decision. A forwarding decision is a determination of how to process the aforementioned frame/cell. Such processing may include counting statistics, dropping the frame or cell, or sending the frame or cell to a set of specified egress ports. In FIG. 15, this process is shown at a gross level. An input stream of four characters is shown b.c.d.e. The characters have appropriate matching entries in memory, with a character input producing a pointer to the next character. The final character b produces a pointer to a forwarding entry. A different stream of characters than that illustrated would have a different collection of entries in memory producing different results.

Figure 18:
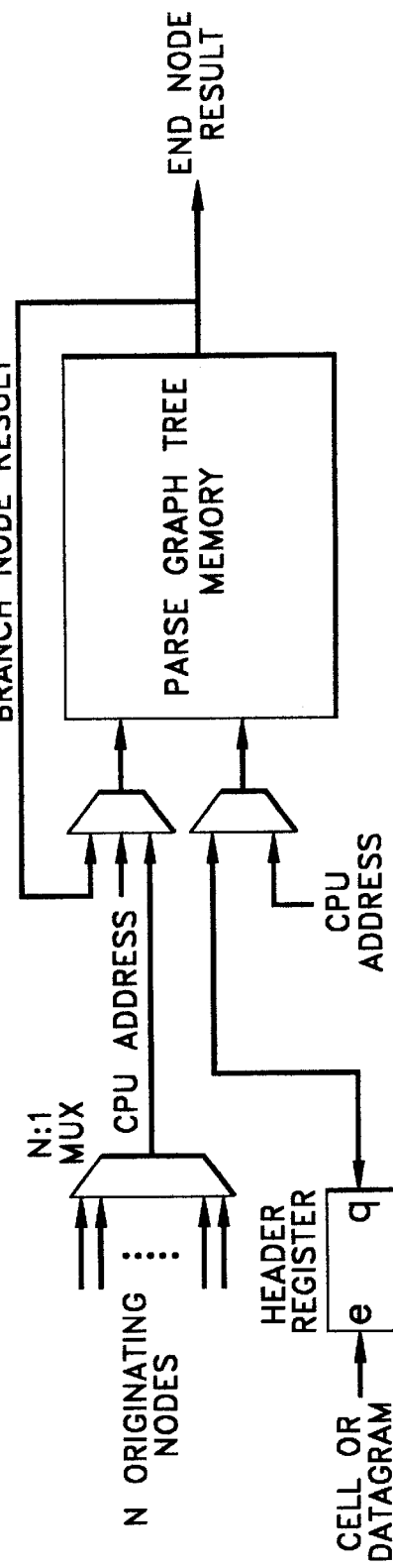
FIG. 18 is a first stage parse graph tree lookup block diagram.

The proposed Ingress Forwarding Engine 14 is defined to be a Parsing Micro-Engine. The Parsing Micro-Engine is divided into two parts—an active part and a passive part. The active part is referred to as the parser, being logic that follows instructions written into the passive memory component which is composed of two major storage sections: 1)Parse Graph Tree (PGT), FIG. 18, and 2) Forwarding Lookup Table (FLT), FIG. 19, and a minor storage section for statistics collection. The Parse Graph Tree is storage area that contains all the packet header parsing information, the results of which is an offset in the Forwarding Lookup. The FLT contains information about the destination port, multicast information, egress header manipulation. The design is very flexible, e.g. in a datagram, it can traverse beyond the DA and SA fields in the packet header and search into the Protocol field and TCP Port number, etc. The proposed PGT is memory that is divided into the $2^n$ blocks with each block having $2^m$ elements (where m<n ). Each element can be one of three types—branch element, leaf element, or skip element and within each block, there can be any combination of element types.

While particularly useful for the purpose of the present invention, the Parsing Micro-Engine is generic from the standpoint that it examines an arbitrary collection of bits and makes decisions based on that comparison. This can be applied, for example, to any text-searching functions, searching for certain arbitrary words. In such applications, as an illustration, words such as "bomb" or "detonate" in a letter or email may be searched and if a match is detected, the search engine may then execute predetermined functions such as signaling an alarm. In fact the same memory can even be used to search for words in different languages.

In the context of the invention, FIG. 14 illustrates having two entry points. One entry point is used to search for text in one language, while the second entry point is used to search for text in another language. Thus the same mechanisms and the same hardware are used for two types of searches.

There are two components to the datagram header search, software component and the hardware component. The software component creates the elements in the Parse Graph for every new route it finds on an interface. The software has to create a unique graph starting from a Branch Element and ending on a Leaf Element, later defined, for each additional new route. The hardware walks the graph from branch to Leaf Element, clueless about the IP header.

Figure 17:
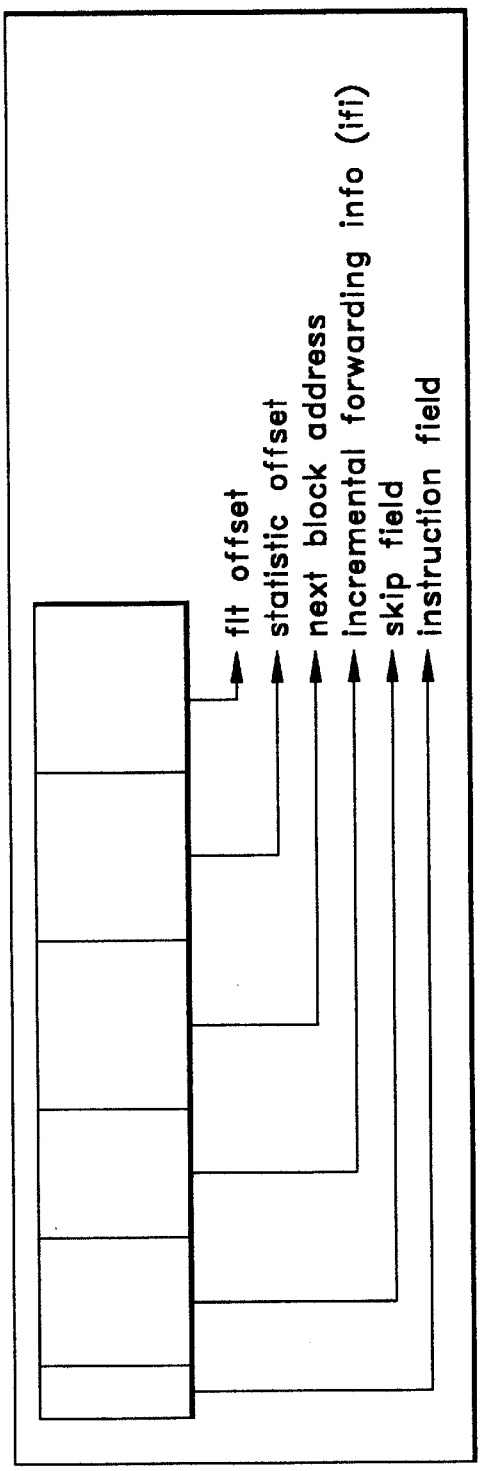
Figure 21:
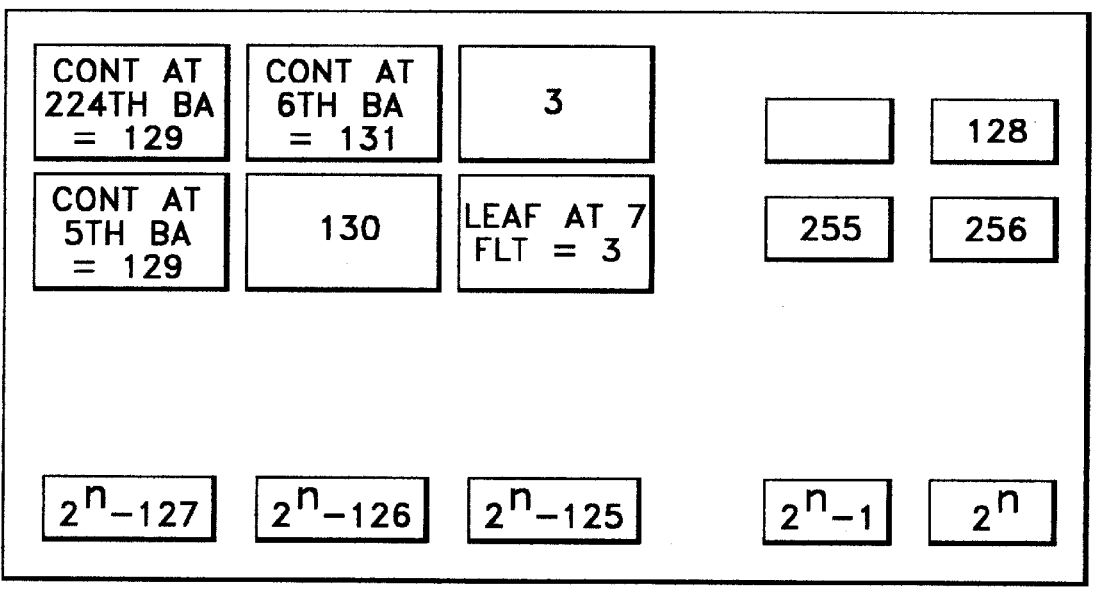

In fact there can be many entry points in the memory region as illustrated in FIG. 21. The initial memory can be divided into multiple regions, each region of memory being a separate series of instructions used for different applications. In the case of FIG. 22, one of the regions is used for IP forwarding while the other region is used for ATM forwarding. At system start, the memory is initialized to point to "unknown route", meaning that no forwarding information is available. When a new entry is inserted, the structure of the Lookup Table changes,. as illustrated in FIG. 23. The illustrative IP address 209.6.34.224 is shown inserted. Since this is a byte-oriented lookup engine, the first block has a pointer inserted in the 209 location. The pointer points to a block that has a new pointer value in the 6 location, and so on until all of the 209.6.34.224 address is inserted. All other values still point to unknown route. Inserting the address in the IP portion of memory has no impact in the ATM portion of memory. As mentioned earlier, there are $2^n$ blocks each with $2^m$ elements in the parse graph tree. The structure of each element is a shown in FIG. 17, with each element having the following fields.

1. Instruction Field: In the current design there are three instructions resulting in two bit instruction field. The instruction description is as follows.

Branch Element (00). In so far as the Micro Engine is concerned, the branch element essentially points the Forwarding Engine to the next block address. Also, within the branch element, the user may set various fields in the 'Incremental Forwarding Info Field,' FIG. 18, and update various mutually exclusive elements of the final Forwarding Information. For example, if the micro engine was parsing an IP header, and the branch element was placed at the end of the destination field, then the user could update the egress port field of the forwarding information. For ATM switching, the user would update the egress port information at the end of parsing the VPI field.

Leaf Element (01). This element instructs the end of parsing to the micro engine. The forwarding information accumulated during the search is then forwarded to the next logical block in the design.

Skip Element (10). This element is provided to speed up the parsing. The time it takes to parse a packet header depends on the number of block addresses the micro engine has to look up. Not every sequential field in the incoming header is used to make a decision. If the skip element were not there then the micro engine would have to keep hopping on non-significant fields of the incoming stream, adding to parsing time. The skip element allows the micro engine to skip fields in the incoming datagram and continue the search. The skip size is described below.

2. Skip Field: This field is especially used for the skip element. This allows the parser to skip incoming datagram header fields to allow for faster searching. In an IP header, for example, if the user wanted to forward packet based on DA but count statistics based on ToS (Type of Service) field, it would parse the entire DA and then step to the ToS Field. This makes for a faster Forwarding Engine. The size of this field should be calculated to allow for the largest skip that the user would ever need for its data switching box, which could be based on the protocol, etc.

3. Incremental Forwarding Info Field: During header parsing, forwarding information is accumulated. The forwarding information may have many mutually exclusive fields. The Forwarding Engine should be flexible enough to update each of these mutually exclusive fields independently, as it traverses the incoming datagram header. During parsing of an IP packet, for example, the egress port could be decided based on the destination field, filtering could be decided on the source address, with QoS decided based on the TOS field. Another example could be for ATM parsing. The egress parsing could be decided based on VPI field, and the statistics count could be decided based on the VCI. As the parsing is done, therefore,various pieces of the forwarding information are collected, and when a leaf node is reached, the resulting forwarding information is passed on to the control path. The width of the incremental forwarding information (hereafter referred to as IFI) should be equal to the number of mutually exclusive incremental pieces in the forwarding information.

4. Next Block Address Field: This field is the next block address to lookup after the current one. The leaf node instruction ignores this field.

5. Statistics Offset Field: In data switches, keeping flow statistics is as crucial as the switching data itself. Without keeping flow statistics it would be difficult, at best, to manage a switch. Having this statistics offset field allows one to update statistics at various points of the parse. On an IP Router, for example, one could collect packet count on various groups of DA, various Groups of SA, all ToS, various protocols etc. In another example dealing with an ATM switch, this field could allow the user to count cells on individual VPI or VCI or combinations thereof. If the designer wants to maintain $2^s$ counters, then the size of this field should be s.

6. FLT Offset Field: This is an offset into the Forwarding Lookup Table, FIG. 18, later discussed in more detail. The Forwarding Lookup Table has all the mutually exclusive pieces of information that is required to build the final forwarding information packet.

Reference Hardware Design Example

The following is an example of a hardware reference design for the parser useful with practice of the present invention. The reference design parser has storage that contains the packet/cell under scrutiny. This storage element for the cell/frame header information is to be two levels in depth. This creates a two-stage pipeline for header information into the destination lookup stage of the Ingress Forwarding Engine. This is necessary because the Ingress Forwarding Engine will not be able to perform a lookup until the entire header information has been stored due to the flexible starting point capability. The two stage pipeline allows the Ingress Forwarding Engine to perform a lookup on the present header information and also stores the next header information in parallel. When the present header lookup is completed, then the next header lookup can proceed immediately.

The storage element stores a programmable amount of the incoming bit stream. As an example, the configuration may be 64 bytes for IP datagrams and 5 bytes for cells. For an interface that handles both cells and frarries, the maximum of these two values may be used.

A DMA Transfer Done signal from each DMA channel will indicate to a state machine that it can begin snooping and storing header information from the Ingress DMA bus. A packet/cell signal will indicate that the header to be stored is either a packet header or a cell header. When header information has been completely stored from a DMA channel, a request lookup will be asserted.

For header lookups, there will be a register-based table which will indicate to the Ingress Forwarding Engine the lookup starting point in the IP Header Table. The Ingress Forwarding Engine uses the source interface number to index. This table, this information allows the Ingress Forwarding Engine to start the search at any field in the IP header or fields contained in the data portion of the packet. This capability, along with the skip functions later explained, will allow the Ingress Forwarding Engine to search any fields and string them together to form complex filtering cases per interface.

Figure 19:
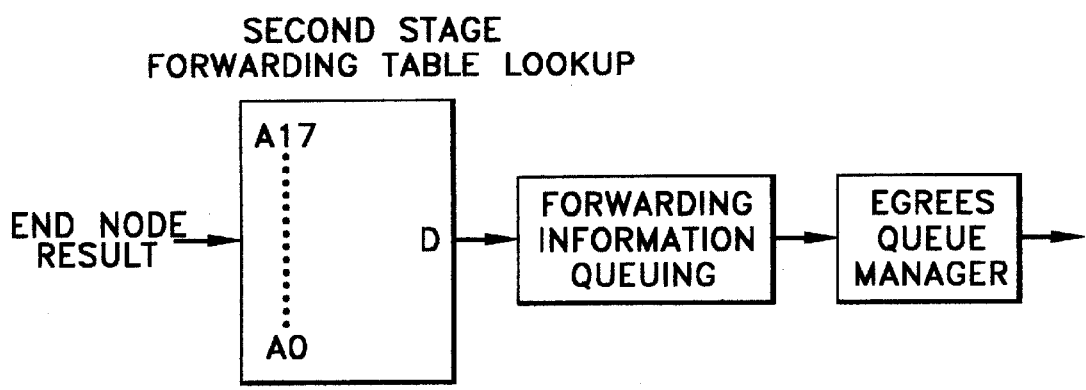
FIG. 19 is a second stage forwarding table lookup (FLT) diagram.

A suitable hardware lookup is shown in FIG. 19 using a Parse Tree Graph lookup algorithm to determine a forwarding decision. This algorithm parses either a nibble or a byte at a time of either an IP destination address or VPI/VCI header. This capability is programmable by software. Each lookup can have a unique tree structure which is pointed to by one of sixteen originating nodes, one per interface. The originating nodes are stored in a programmable register-based table, allowing software to build these trees anywhere in the memory structure.

A nibble or byte lookup can result in either an end node result or a branch node result. The lookup control state machine controls the lookup process by examining the status flag bits associated with each lookup. These status flag bits are the end node, skip node, and skip size. The end node flag bit indicates if the lookup was an end node or a branch node. If it was an end node, then the lookup result is the index value into the second stage Forwarding Table Lookup memory. If it was a branch node, then the nibble or byte lookups will continue until an end node is found. Each branch node lookup result is the pointer to the next branch node. The skip node flag bit instructs the state machine to skip a number of nibbles, indicated by the skip size, during the lookup. The bank select flag bits indicate which bank will be used in the next lookup. The lookup state machine will use these bits to determine which clock enables and mux controls to activate.

The result of the Parser lookup is the Forwarding Table lookup which is a bank of memory yielding the forwarding result, including the forwarding information called the Forwarding ID. In order to optimize lookup time performance, this lookup stage can be pipelined, allowing the first stage to start another lookup in parallel. The Forwarding ID field will be used in several ways. First, the MSB (Most Significant Byte) of the field is used to indicate a unicast or multicast packet at the network interface level. For multicast packets, for example, the Egress Queue Manager will need to look at this bit for queuing of multicast packets to multiple interfaces. For unicast packets, for example, six bits of the Forwarding ID can indicate the destination interface number and the remaining 16 bits will provide a Layer 2 ID. The Layer 2 ID will be used by the Egress Forwarding logic to determine what Layer 2 header needs to be prepended to the packet data. For packets, these headers will be added to the packet as it is moved from the Egress DMA FIFO (first in, first out) to the Egress Buffer Memory. For cells, the Layer 2 ID will provide the transmit device with the appropriate Channel ID.

For unicast traffic, the Destination IIF number indicates the network destination interface and the Layer 2 indicates what type of Layer 2 header needs to added onto the packet data. For multicast, the multicast ID indicates both the type of Layer 2 header addition and which network interfaces can transmit the multicast. The Egress Queue Manager will perform a Multicast ID table lookup to determine on which interfaces the packet will get transmitted on and what kind of Layer 2 header is put back on the packet data.

An Example of Life of a Packet Under the Forwarding Engine

It is now in order to explain examples of a simple and a complex packet through the Forwarding Engine of the invention. On power up, FIG. 19, all $2^n$ blocks of the parse graph are filled with leaf elements pointing to an FLT offset that will eventually forward all packets to the Control Processor on the Network Card. This is a default route of all unrecognized packets. Software is responsible of setting up the default route. The way in which the various elements are updated into this parse graph memory will be explained for the illustrated cases of a simple multicast IP packet with mask 255.255.0 sand a complex filter packet, aging the simple IP Packet.

Simple Multicast Packet

On power up, the entire blocks in the Parse Graph Memory may be assumed to be filled with leaf elements that point to $1^{st}$ offset of FLT which will route the packet to the Network Processor. Let it now be assumed for this example, that the ingress packet has a destination IP Address of 224.5.6.7. In this case, the hardware will lookup the $224^{th}$ offset in the $1^{st}$ block (the first lookup block is also called originating node) and find a leaf. The hardware will end the search and look up the default offset in the $224^{th}$ location and look up the FLT and forward the packet to the control processor.

When the control processor forwards subsequent packets of Destination IP address 224.5.6.7. it will generate the graph shown in FIG. 21.

The software first has to create the parse graph locally. The parse graph created is listed as 1-129-2-131. The software always looks up the first block a.k.a originating node. The offset in the first block is 224, which is the first byte of the destination IP header. It finds a default route,—an indication for software to allocate a new block for all subsequent bytes of the destination IP address. Once the software hits a default route, it knows that this is a link node. From the link node onwards, the software has to allocate new blocks for every byte it wants the hardware to search for a matched destination IP address. Through an appropriate software algorithm, it finds that 129, 2, 131 are the next three available blocks to use. The software will then install continuation element with BA of 2 in the $5^{th}$ offset of block 129, continuation element with BA of 131 in $6^{th}$ offset of block 2, and a leaf element of FLT offset 5 at $7^{th}$ offset of block 131. Once such a branch with a leaf is created, the node link is then installed. The node has to be installed last in the new leafed branch. The node in this case, is a continuation element with BA of 131 at offset 224 of the $1^{st}$ block.

The hardware is now ready for any subsequent packets with destination IP address 224.5.6.7, even though it knows nothing about it. Now, when the hardware sees the 224 of the the destination IP address, it goes to the $224^{th}$ offset of $1^{st}$ block of the parse graph and finds a continuation element with BA of 129. The hardware will then go to the $5^{th}$ offset (second byte of destination IP address) of the $129^{th}$ block and find another continuation element with BA of 2. The hardware will then go to $6^{th}$ offset (third byte of destination IP address) of the $2^{nd}$ block and find another continuation element with BA of 131. The hardware will then go to $7^{th}$ offset (fourth byte of destination IP address) of the $131^{st}$ block and find a leaf element with FLT of 3. The hardware now knows that it has completed the IP match and will forward the forwarding ID in location 2 to the subsequent hardware block, calling the end of packet parsing.

It should be noted that the hardware is simply a slave of the parse graph put in memory by software. The length of the search purely depends on the software requirements of parsing length and memory size. The adverse effec ts of such parsing are size of memory, and search time which is directly proportional to the length of the search.

In this case, the search will result in the hardware effecting 4 lookups in Parse Graph and 1 lookup in FLT.

Packet with Mask 255.255.255.0

Figure 20:
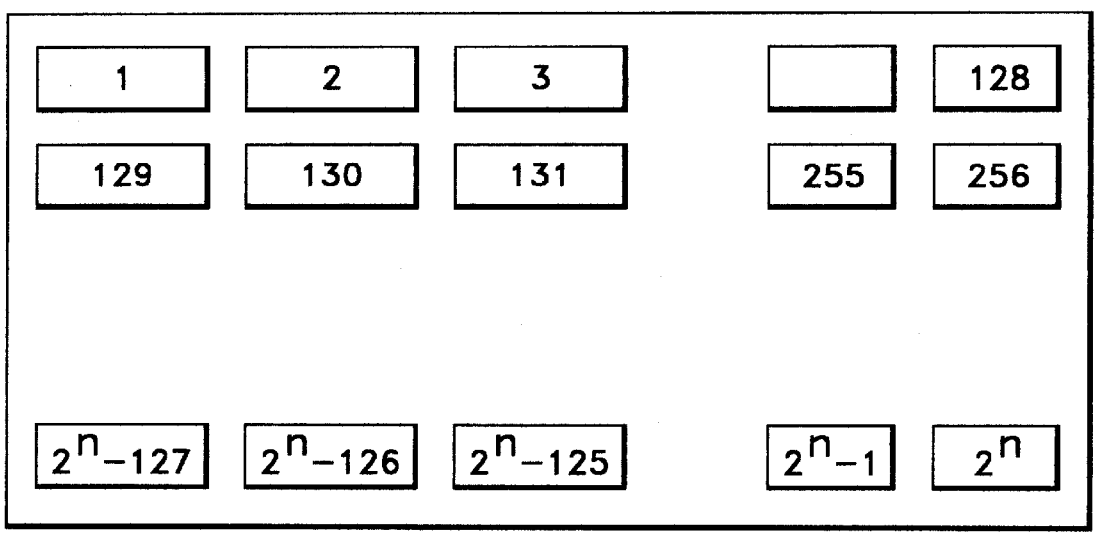
FIGS. 20 and 21 are respective diagrams of parse graph memory on power up and of a simple illustrative IP multicast packet.

Building upon a the parse graph in FIG. 20, a packet with an illustrative mask 255.255.255.0 and address of 4.6.7.x is now installed. In this case, the software will go to the $4^{th}$ offset in the originating node and find a continuation element with BA of 129. The software will then go to offset 6 in block 129 and find a default FLT offset. The software then knows that this is a link node. From now on, it has to allocate more blocks in the parse graph, such as block 2. At offset 7 of block 2, it will install a leaf element with FLT 3. Then it will install the lin node consisting of writing a continuation element with BA of 2 at offset 6 of block 129.

When the hardware receives any packet with the header 4.6.7.x, it will look into the $4^{th}$ offset originating node and find a continuation element with BA of 129, then look at the $6^{th}$ offset in block 129 and find a continuation element with BA 131, and then look at the leaf element at offset 7 with FLT of 3. This FLT will be of value 3 which is then forwarded to the Buffer Manager and eventually the Egress bandwidth manager.

Packet with Mask 255.255.0.0

This subsection will build upon the parse graph in FIG. 20 and install a packet with an illustrative mask 255.255.0.0 and address of 4.8.x.y. In this case, the software will go to the $4^{th}$ offset in the originating node and find a continuation element with BA of 129. The software will then go to offset 8 in block 129 and find a default FLT offset. At this time the software knows that it has to install a new FLT (say 4)offset in the $8^{th}$ offset of block 129.

The hardware when it receives any packet with the header 4.8.x.y it will look into the $4^{th}$ offset originating node and find a continuation element with BA of 129, then look at the leaf element of block with FLT of 4, and terminate the search. In this case the hardware will do only 2 lookups.

Complex Filtered Packet

Now assume that there was a requirement to filter a packet with header 4.5.6.8.9.x.y.z. 11. There are no restrictions to the above concept of parsing the packet, and the time it takes to parse the packet will increase since the hardware will have to read and compare 9 bytes. The hardware will simply keep parsing however until it sees a leaf element. The x.y.z bytes are blocks which contain continuation elements pointing to the next block with all continuation elements of x pointing to block y, all continuation elements of y pointing to block z, and all continuation elements of z pointing to the block which has entry 11 as a leaf, and the rest being default. This is where the fork element comes into play and may be called up to lookup the forwarding at the end of search 4.5.6.8.

Removing Simple IP Multicast Packets

The removal of packets is similar to the reverse of adding address to the parse graph, above explained. The psuedocode for removal in this embodiment is as follows:

Walk down to end of leaf remembering each block address and offset in block.

```
FOR (From Leaf node to originating node)
    IF (only element in block)
        set default FLT offset at the previous NODE offset address
        free the last block
        go to previous block
    ELSE
        set default FLT offset at last leaf.
        exit
    ENDIF
END FOR
```

Egress Bandwidth Manager

Every I/O Module connects a NeoN port to one or multiple physical ports. Each I/O Module supports multiple traffic priorities injected via a single physical NeoN Port. Each traffic priority is assigned some bandwidth by a network manager, as illustrated in FIG. 14, being labeled as the "QoS (Packet & Cell)". The purpose of this section is to define how bandwidth is managed on multiple traffic profiles.

NeoN Queuing Concepts

The goal of NeoN Queuing, of the invention, thus, is to be able to associate a fixed configurable bandwidth with every priority queue and also to ensure maximum line utilization. Traditionally, bandwidth enforcement is done in systems by allocating a fixed number of buffers per priority queue. This means that the enqueing of data on the priority queues enforces bandwidth allocation. When buffers of a certain queue are filled, then data for that queue is dropped (by not enqueuing data on that queue), this being a rough approximation of the ideal requirement.

There are many real life analogies to understanding the concept of QoS of the present invention, e.g. cars on a highway with multiple entry ramps or moving objects on a multi-channeled conveyor in a manufacturing operation. For our purposes, let us examine the simple case of "cars on a highway". Assume that 8 ramps were to merge into one lane at some point on the highway. In real life experiences, everyone knows that this could create traffic jams. But if managed correctly (i.e. with the right QoS), then the single highway lane can be utilized for maximum efficiency. One way to manage this flow is to have no control, and have it be serviced on a first come, first serviced method. This means that there is no distinction between an ambulance on one ramp and someone headed to the beach on another ramp. But in the methodology of the invention, we define certain preferential characteristics for certain entry ramps. There are different mechanisms that we can create. One is to send one car from each entry ramp in a round robin fashion, i.e. each ramp is equal. This means counting cars. But if one of these "cars" turns out to be a tractor trailer with 3 trailers, then in fact equal service is not being given to all entry ramps as measured by the amount of highway occupied. In fact if one entry ramp is all tractor trailers, then the backup on the other ramps could be very significant. So it is important to measure the size of the vehicle and its importance. The purpose of the "traffic cop" (aka QoS manager) is to manage which vehicle has the right of way, based on size, importance and perhaps lane number. The "traffic cop" can, in fact, have different instructions every other day on the lane entry characteristics based on what the "town hall manager" (aka network manager) has decided. To conclude the concept of QoS understanding, QoS is a mechanism which allows certain datagrams to pass through queues in a controlled manner, so as to achieve a deterministic and desired goal, which may vary from application to application e.g. bandwidth utilization, precision bandwidth allocation, low latency, low delay, priority etc.

The NeoN Queuing of the invention handles the problem directly. Neon Queuing views the buffer allocation as an orthogonal parameter to the Queuing and bandwidth issue. NeoN Queuing will literally segment the physical wire into small time units called "Time Slice" (as an example, approximately 200 nanoseconds on OC48—time of 64 byte packet on an OC48). Packets from the back-plane are put into the Priority Queues. Each time a packet is extracted from a queue, a timestamp is also tacked along with that queue. The time stamp indicates distance in time from a 'Current Time Counter' in Time Slice Units, and when the next packet should be de-queued. The 'distance in time' is a function of a) packet size information coming in from the back plane, b) the size of Slice Time itself and c) the bandwidth allocated for the priority queue. Once a packet is de-queued, another counter is updated which represents the Next Time to De-queue (NTTD)—such being purely a function of the size of the packet just de-queued. NTTD is one for cell-based cards, because all packets are the same size and fit in one buffer. This really proves that the NeoN Egress Bandwidth Manager is monitoring the line to determine exactly what next to send. This mechanism, therefore, is a bandwidth manager rather than just a de-queuing engine.

The NeoN Queuing of the present invention, moreover, may be thought of as a TDM scheme for allocating bandwidth for different priorities, using priority queuing for ABR (Available Bit Rate) bandwidth. Added advantages of the NeoN Queuing are that, within the TDM mechanism, bandwidth is calculated not on 'packet count' but on 'packet byte size'. This granularity is a much better replica of the actual bandwidth utilization and allows true bandwidth calculations rather than simulated/approximations. The second 'NeoN Advantage' is that the Network Manager can dynamically change the bandwidth requirement, similarly to a sliding scale on a volume control. This is feasible since the bandwidth calculations for priority queues are not at all based on buffer allocations. In Neon Queuing, rather, the bandwidth allocation is based on the time slicing the bandwidth on the physical wire. This type of bandwidth management is absolutely necessary when running at very high line speeds, to keep line utilization high.

| Mathematics Used during Queuing First we will develop the variables and constants being used in the ultimate mathematics. | |
|---|---|
| Symbols | Description |
| TS | Time Slice of bandwidth on wire used for calculations, (200 n Sec for OC48). |
| NTTS | Next Time To Send. This number in units of Ts representing a address to de-queue from current time. |
| BitTime | Time period of a single bit on the wire of the current I/O module |
| $\Delta n$ | Delay factor in Number of TS, representing bandwidth calculations set by Network Manager, for priority Queue n. |
| BWn | Bandwidth of Queue n in Percentage as entered or calculated by the CPU Software. |
| Pn | Number of Priority Queues. |
| TBW | Total Bandwidth of the wire |
| NTTD | Next Time To Dequeue. |
| CT | Current Time in TS units. |

Consider first the user interface level to see how bandwidth is allocated amongst various priorities. The user is normally given the job of dividing 100% bandwidth amongst various priorities. The user could also be presented with breaking up the entire bandwidth in bits per second (as an example for OC48, it would be 2.4 Gbits). In either case, some CPU software calculates a number pair, priority-$\Delta n$, from %-priority or mBits/sec-priority. Since the CPU is doing this calculation, it can be easily changed based on the I/O module. The Bandwidth Manager does not need to know about the I/O module type, only caring about the priority-$\Delta n$ pair. Thus if a user connected to the NeoN port that cannot handle data at full line rate, the CPU can change this value to adjust for the customer requirements.

$$\Delta n = 100 / BWn \quad (1)$$

Data (in form of packet address) from the priority queues is de-queued on the output fifo. The de-queue engine calculation of the Next Time To Send for that queue is governed by equation (2) below. There is one such number for each queue, which gets updated every time a packet is de-queued. The Calculations for NTTS are.

$$NTTS_n = ((\text{Packet Byte Count} * BitTime)/(TS)) * \Delta_n) + NTTS_{n-1} \quad (2)$$

where Bit Time is a constant that may be fed by the CPU on power-up, depending on the I/O Module. Keeping $NTTS_n$ two decimal places would mean that we would have the ability to enforce bandwidth to the $100^{th}$ of a TS time, as time approaches infinity, but with instant granularity always being TS time.

Next Time To De-queue is the time that we start the de-queue process after the current de-queue. This is primarily based on the current time and the number of buffers in a packet just de-queued:

$$NTTD_n = ((\text{Packet Byte Count} * \text{BitTime}) \bmod (TS)) + CT \quad (3)$$

Queuing Processing

It is now in order to decide the processing needed to queue addresses from the back-plane on to the Priority Queues, FIG. 24, which depicts the overall queuing and scheduling process. Control Data, which includes datagram addresses, from the 'NeoN Control Data Switch', is sorted into priority queues based on the QoS information embedded in the control Data, by the Queue Engine. The Scheduling Engine operation is rendered independent of the Queue Engine which schedules datagram addresses through use of the novel algorithms of the invention listed further below.

The queuing Engine has the following tasks:

Enqueue Data Read input fifo and queue the packet onto the appropriate queue. There are 8 priority queues and 1 Local CPU queue and one Drop Queue.

Watermark Calculations Calculate when to put back pressure on the ingress based on watermarks set for a queue.

Drop Packets Start Dropping packets when the Priority Queues are full.

For each Priority Queue $P_n$, there will be a 'head pointer—pHead$_n$' and a 'tail pointer—pTail$_n$'. Input Fifo feeds the priority Queues $P_n$ with buffer address from the back-plane. Additionally, there is a forward. For OC48 rates, and assuming 64 byte packets as average size packets, the following processing will be done in about 200 nSecs. The preferred pseudo code of the invention for the En-queue Processor is as follows.

```
Read input Fifo.
Find priority of the packet
IF(room on queue)
    move buffer from Input Fifo to *pTail_n priority queue.
    Advance pTail_n.
    update statistics
    increment buffer count on queue
    IF(packet count on >= watermark of that queue)
        set back-pressure for that priority
        update statistics
    ENDIF
ELSE
    move buffer from Input Fifo to drop queue.
    Update statistics
ENDIF
```

The following is a verbal explanation of the psuedocode listed above. As each control packet is read from the 'Neon Control Data Switch' it is put onto one of N queues after it is verified for physical space available on the queue. If there is no room set on the queue the data is put on a drop queue, which allows the hardware to return addresses back to the originating port via the 'NeoN Control Data Switch'. Also a watermark is set, per queue, to indicate to the ingress to filter out non-preferred traffic. This algorithm is simple but needs to be executed in one TS. Scheduling Processing This section will list the algorithm used to de-queue address from Priority Queues Pn onto the output fifo. This calculation also has to be done during one TS.

```
Wait here till CT == NTTD AND no back      // sync up
pressure from output fifo.                  // some variable.
X = FALSE
FOR (all P_n, High to Low)
    IF (pHead_n != pTail_n)
        IF (CT >= NTTS_n)
            De-Queue (pHead_n)
            Calculate new NTTS_n    // see equation (2) above.
            Calculate NTTD           // see equation (3) above.
            update statistics
            X = TRUE
        ENDFOR
    ENDIF
    ENDIF
ENDFOR
IF (X == FALSE)
    FOR (all P_n, High to Low)
        IF (pHead_n != pTail_n)
            DeQueue (pTail_n)
            update statistics
            X = TRUE
        ENDFOR
    ENDIF
    ENDFOR
ENDIF
IF (X == FALSE)
    update statistics
ENDIF
Update CT
```

The function De-Queue is conceptually a simple routine, listed below.

De-Queue($Q_n$)
    *pOutputQTail++=*pHead$_n$++

The explanation of the psuedocode listed above is that there are two FOR loops in the algorithm—the first FOR loop enforcing the committed bandwidth to the queue, and the second FOR loop serving for bandwidth utilization, sometimes called aggregate bandwidth FOR Loop.

Examining first the Committed FOR Loop, the queues are checked from the Highest Priority Queue to the Lowest Priority Queue for available datagram to schedule. If a queue has available datagram, the algorithm will check to see if the Queues Time has to dequeue, by comparing its NTTS$_n$ against CT. If the NTTS$_n$ has fallen behind CT, then the queue is Dequeued; otherwise, the search goes on for the next Queue until all queues are checked. If a data from a queue is scheduled to go out, a new NTTS$_n$ is calculated for that queue and a NTTD is always calculated when any queue is de-queued. When a network manager assigns weight for the queues, the sum of all weights should not be 100%. Since NTTS$_n$ is based on datagram size, the output data per queue is a very accurate implementation of the bandwidth set by the manager.

Let us now examine the Aggregate FOR Loop. This loop is only executed when no queue is de-queued during the Committed FOR loop. In other words only one de-queue operation is performed in one TS. In this FOR Loop, all queues are checked from Highest Priority to Lowest Priority for available data to dequeue. The algorithm is in this FOR Loop for one of two reasons; either there was no data in all the queues, or the NTTS$_n$ of all queues were still ahead of CT (it was not time to send). If the algorithm entered the aggregate FOR Loop for empty queues then the second time around the fate will be the same. However if the aggregate FOR Loop was entered because the NTTS$_n$ was not reached for all queues then the aggregate will find the highest priority such queue and de-queue it, also in that case it would update $NTTS_n$ and calculate NTTD.

The algorithm has built in credits for queues that do not have data to de-queue in their time slot; and debits for data that is de-queued in the Aggregate Loop. These credits and debits can accumulate over large periods of time. The debit and credit accumulation time is a direct function of the size of $NTTS_n$ field in bits; for example, a 32 bit number would yield 6 minutes in each direction at using 160 nSec as TS ($2^{32}*160$ nSec). Each individual queue could be configured to lose credits and/or debits, depending on the application this algorithm is used. For example if the algorithm was to be used mainly for CBR type circuits one would want to clear the debits fairly quickly, where as for bursty traffic they could be cleared rather slowly. The mechanism for clearing debits/credits is very simple, asynchronously setting $NTTS_n$ to CT. If $NTTS_n$ is way ahead of CT, Queue has build a lot of debit. Then, setting the $NTTS_n$ to CT would mean losing all the debit. Similarly if $NTTS_n$ had fallen behind CT, Queue has built a lot of Credit. Then, setting $NTTS_n$ to CT would mean losing all the credit.

Example of Implementing CBR Queue Using the Algorithm

It is now appropriate to examine how to build a CBR queue out of the algorithm listed above, again referencing FIG. 24. Let it be assumed that the output wire is running at OC48 speeds (2.4 Gbits Per second) and that Queue 1 (highest Priority Queue) has been assigned to be the CBR Queue. The way we configure the weight on the CBR queue is configured by summing all the input CBR flow bandwidth requirements. For sake of simplicity there are 100 flows going through the CBR Queue, each with a bandwidth requirement of 2.4 Mbits per second. The CBR Queue bandwidth will then be 2.4 Mbits/sec times 100, i.e. 240 Mbits per second (i.e. 10%). In other words, $QRATE_{cbr}=\Sigma$ Ingress Flow Bandwidth.

$\Delta_n=100/10=10$. Based on Equation 1

$NTTS_n$ would result in 10 every time a 45 byte datagram is dequued.—Based on Equation 2.

$NTTS_n$ would result in 20 every time a 90 byte datagram is dequued.—Based on Equation 2.

NTTD would result in 1 every time a 45 byte datagram is dequeued.—Based on Equation 3.

NTTD would result in 2 every time a 90 byte datagram is dequeued.—Based on Equation 3.

This shows that the queue will be de-queued very timely; based on datagram size and the % of bandwidth allocated to the queue. This algorithm is independent of wire speed, making it very scalable, and can achieve very high data speeds. This alogorithm also takes datagram size into account during scheduling regardless of a the datagram being a cell or a packet. So long as the network manager sets the weight of the queue as the sum of all ingress CBR flow bandwidth, the algorithm provides the scheduling very accurately.

Example of Implementing UBR Queue Using the Algorithm.

It is very simple to implement a UBR queue using this algorithm, UBR standing for the queue which uses the left over bandwidth on the wire. To implement this type of queue, one of N queues with 0% bandwidth, and then this queue is de-queued when there is literally no other queue to de-queue. The NTTS will be set so far in the future that after the algorithm de-queues one datagram the next one is never scheduled.

QoS Conclusion

As has been demonstrated, the algorithm of the invention is very precise in delivering bandwidth, and its granularity is based on the size of TS being independent of Cell/Packet information, and also provides all of the ATM services required; implying that not only packets also enjoy the ATM services but cells and packets coexist on the same interface.

Real Life Network Manager Examples

This section will now consider different Network Management bandwidth management scenarios, all well handled by the invention. Insofar as the NeoN Network controller is concerned, there are n queues egress (as an example it could be 8), each queue being assigned a bandwidth. The Egress Bandwidth Manager will deliver that percentage very precisely. The Network Manager can also decide not to assign 100% of the bandwidth to all queues, in which case the left over bandwidth will simply be distributed on a high to low priority basis. Besides these two levels of control, the Network Manager can also examine statistics per priority and make strategic statistical decisions on it own and change percentage allocations.

Exemplary Case 1: Fixed Bandwidth

In this scenario, 100% of the-bandwidth is divided into all queues. If all queues are full at all times, then the queues will behave exactly like Fair Weighted Queuing. The reason for this is that the Egress Bandwidth Manager will deliver the percentage of the line bandwidth as requested by the Network Manager, and since the queues are never empty, the egress bandwidth does not have time to execute the second FOR loop (Aggregate Loop), above discussed.

If the queues are not full all the time, however, then during the time the queue is empty some other queue may be serviced ahead of its time without a charge against its bandwidth.

As an example, if the Network Manager decided to allocate 12.5 % bandwidth to every one of the eight queues, then the Network Manager has to provide to the Egress bandwidth Manager:

| | |
|---|---|
| $\Delta_n$-Priority | List of all $\Delta_n$ one for each priority. |
| Bit Time | Based on I/O Module Egress Bandwidth Manager is running on. |

For a bandwidth of 12.5 %, $\Delta_n$ would calculate to be 8.00 (100/12.5). For a OC48 bit time, this would calculate to be 402 psec.

Exemplary Case 2: Mixed Bandwidth

In this example, not all of the bandwidth is divided into all of the queues. In fact, the sum of all fixed bandwidth on the queues is not 100% of the bandwith available. The Egress bandwidth Manager will deliver the constant bandwidth on the queues up to the allocated amount, and then aggregate traffic amongst the priorities on the remaining bandwidth. This guarantees some percent of a class of traffic to make it through the port and also provides prioritized traffic. For queues that are not full during the allocated time, that bandwidth will be lost to the aggregate bandwidth.

Exemplary Case 3: No Mixed Bandwidth For All Queues

In this scenario, 0% is allocated as fixed bandwidth for all queues. The queues will then behave purely like prioritized queuing. The first For Loop listed in section 0 Scheduling, will considered as NOP.

Exemplary Case 4: Dynamic Bandwidth

In this illustration, the Network Manager may initially come up with No Mixed Bandwidth for all Queues and then, as it starts to build committed bandwidth circuits, it may create fixed bandwidth queues. The sum of the requirements of bandwidth of the flows at an ingress port would dictate the size of the constant bandwidth on the egress port. The granularity of the allocatable egress bandwidth is largely dependent on the depth of the floating point depth. As an example, it may be assumed that two decimal places may suffice. This then implies $100^{th}$ of one percent, and would calculate to be 240 kHz for an OC48 line and 62 kHz for an OC12 line.

It should be observed that the above cases are examples only, and the application of the algorithm of the invention is not limited to these cases.

Further modifications will occur to those skilled in this art, and such are considered to fall within the spirit and scope of the invention as defined in the appended claims.

What is claimed is:

1. A method of simultaneously processing information contained in data cells and data packets or frames received at the egress of a data networking system, that comprises, applying both the received data cells and data packets to a common data switch; controlling the switch for cell and packet data-forwarding, indiscriminatingly using common network hardware and algorithms for forwarding, based on control information contained in the cell or packet and without transforming packets into cells; and controlling with a common bandwidth management algorithm both cell and packet data forwarding without impacting the forwarding of either, wherein the cell and packet control information is processed in a common forwarding engine with common algorithms independent of information contained in the cell or packet, and wherein the information from the forwarding engine is passed to a network egress queue manager and thence to a network egress transmit facility and in a manner to provide minimum cell delay variation, and fuirther wherein quality of service information is included in the information passed from the forwarding engine and managed by the queue manager for both cells and packets simultaneously and based upon the common algorithm, with queuing managing processing as each control packet is read from the switch, to put the same into one of a plurality of queues after it is verified that available physical space exists on the queue, and wherein, should there be no such space, the data is put in a drop queue and returned by the switch to the ingress of the network.

2. A method as claimed in claim 1 wherein a watermark is set for each queue to instruct each ingress to filter out non-preferred data traffic.

3. A method of simultaneously processing information contained in data cells and data packets or frames received at the egress of a data networking system, that comprises, applying both the received data cells and data packets to a common data switch; controlling the switch for cell and packet data-forwarding, indiscriminatingly using common network hardware and algorithms for forwarding, based on control information contained in the cell or packet and without transforming packets into cells; and controlling with a common bandwidth management algorithm both cell and packet data forwarding without impacting the forwarding of either, wherein the cell and packet control information is processed in a common forwarding engine with common algorithms independent of information contained in the cell or packet, and wherein the information from the forwarding engine is passed to a network egress queue manager and thence to a network egress transmit facility and in a manner to provide minimum cell delay variation, and further wherein quality of service information is included in the information passed from the forwarding engine and managed by the queue manager for both cells and packets simultaneously and based upon the common algorithm, with queuing managing processing as each control packet is read from the switch, to put the same into one of a plurality of queues after it is verified that available physical space exists on the queue, and wherein bandwidth is allocated for different priorities by packet byte size and based upon time slicing the bandwidth.

4. A method as claimed in claim 3 wherein the network manager dynamically varies the bandwidth requirement.

5. A method of processing packets of information from a forwarding switch and queue managing the forwarding, that comprises, as each packet is read from the switch, putting the same into one of a plurality of queues after it is verified that available physical space exists in the queue; placing the packet information in a drop queue should there be no such space and returning the packet information through the switch; setting a watermark for each queue to enable the filtering of non-preferred information traffic; and allocating for different priorities by packet byte size and based upon time slicing the bandwidth.

6. A system architecture apparatus for simulteuly processing information contained in data cells and data packets received at ingress of a data networking system, said apparatus having, in combination, means for applying both the received data cells and data packets from the ingress to a common data switch within the system; means for controlling the switch for cell and packet, indiscriminately forwarding data by a common algorithm based on control information contained in the cell or packet and without transforming packets into cells; means for controlling with a common bandwidth management algorithm both cell and packet data forwarding without impacting the forwarding of either, wherein the cell and packet control information is processed in a common forwarding engine with common algorithms, independent of information contained in the cell or packet, and wherein means is provided for passing the information from the forwarding engine to a network egress queue manager and thence to a network egress transmit facility, and in a manner to provide minimal cell/packet delay variation.

7. Apparatus as claimed in claim 6 wherein quality of service information is included in the information passed from the forwarding engine and managed by the queue manager for both cells and packets simultaneously based upon the common algorithm.

8. Apparatus as claimed in claim 7 wherein a common parsing algorithm is also provided for similarly forwarding both cells and data packets.

9. Apparatus as claimed in claim 7 wherein the queuing managing employs processing that operates as each control packet is read from the switch, to put the same into one of a plurality of queues after it is verified that available physical space exists on the queue.

10. Apparatus as claimed in claim 9 wherein, should there be no such space, means is provided for the data to be put in a drop queue and returned by the switch to the ingress of the network.

11. Apparatus as claimed in claim 10 wherein a watermark is set for each queue to instruct such ingress to filter out non-preferred data traffic.

12. Apparatus as claimed in claim 9 wherein means is provided for allocating bandwidth for different priorities by packet byte size and based upon time slicing the bandwidth.

13. Apparatus as claimed in claim 12 wherein the network manager dynamically varies the bandwidth requirement.

14. Apparatus as claimed in claim 15 wherein the cell data is of ATM fixed size units and the packet data is of arbitrary size.

15. A system architecture apparatus for simultaneously processing information contained in data cells and data packets received at the ingress of a data networking system, said apparatus having, in combination, means for applying both the received data cells and data packets from the ingress to a common data switch within the system; means for controlling the switch for cell and packet, indiscriminately forwarding data by a common algorithm based on control information contained in the cell or packet and without transforming packets into cells; means for controlling with a common bandwidth management algorithm both cell and packet data forwarding without impacting the forwarding of either, wherein the cell and packet control information is processed in a common forwarding engine with common algorithms, independent of information contained in the cell or packet, and wherein, between the ingress and the switch, a VCI function or assembly is interfaced.

16. Apparatus as claimed in claim 15 wherein said assembly connects not only to the switch but also to a header lookup and forwarding engine for both the cell and packet data; with the engine connecting through a control data switch and a quality of service managing module to a buffer, also inputting from the output of the switch.

17. Apparatus as claimed in claim 16 wherein the buffer feeds a cell data VC shaping circuit that connects with the system egress.

* * * * *